(12) United States Patent
Sirotkin et al.

(10) Patent No.: US 9,877,256 B2
(45) Date of Patent: Jan. 23, 2018

(54) SYSTEMS, DEVICES, AND METHODS FOR INTERWORKING BETWEEN A UNIVERSAL MOBILE TELECOMMUNICATIONS SYSTEM (UMTS) NETWORK AND A WIRELESS LOCAL AREA NETWORK (WLAN)

(71) Applicant: Intel IP Corporation, Santa Clara, CA (US)

(72) Inventors: Alexander Sirotkin, Petach Tikva (IL); Richard Burbidge, Shrivenham (GB); Mo-Han Fong, Sunnyvale, CA (US); Nageen Himayat, Fremont, CA (US); Hyung-Nam Choi, Hamburg (DE)

(73) Assignee: Intel IP Corporation, Santa Clara, CA (US)

( * ) Notice: Subject to any disclaimer, the term of this patent is extended or adjusted under 35 U.S.C. 154(b) by 124 days.

(21) Appl. No.: 14/583,057

(22) Filed: Dec. 24, 2014

(65) Prior Publication Data

US 2015/0271729 A1 Sep. 24, 2015

Related U.S. Application Data

(60) Provisional application No. 61/969,790, filed on Mar. 24, 2014, provisional application No. 61/990,693,
(Continued)

(51) Int. Cl.
*H04W 36/30* (2009.01)
*H04W 48/00* (2009.01)
(Continued)

(52) U.S. Cl.
CPC ......... *H04W 36/30* (2013.01); *H04W 48/00* (2013.01); *H04W 28/18* (2013.01);
(Continued)

(58) Field of Classification Search
CPC ..................................................... H04W 88/06
See application file for complete search history.

(56) References Cited

U.S. PATENT DOCUMENTS

| 2010/0291863 A1 | 11/2010 | Hsu et al. |
| 2012/0023189 A1 | 1/2012 | Giaretta et al. |

(Continued)

FOREIGN PATENT DOCUMENTS

| KR | 20050104388 A | 11/2005 |
| KR | 20130094826 A | 8/2013 |

(Continued)

OTHER PUBLICATIONS

International Search Report and Written Opinion dated Jul. 31, 2015 from International Application No. PCT/US2015/027123.
(Continued)

*Primary Examiner* — Michael Thier
*Assistant Examiner* — Kent Krueger
(74) *Attorney, Agent, or Firm* — Schwabe, Williamson & Wyatt, P.C.

(57) ABSTRACT

Embodiments of the present disclosure describe systems, devices, and methods for interworking between a universal mobile telecommunications system (UMTS) network and a wireless local area network (WLAN). Various embodiments may include utilizing traffic steering rules based on radio access network assistance parameters to perform traffic steering between the UMTS network and the WLAN. Other embodiments may be described or claimed.

16 Claims, 5 Drawing Sheets

Related U.S. Application Data filed on May 8, 2014, provisional application No. 62/029,936, filed on Jul. 28, 2014.

(51) Int. Cl.

| | |
|---|---|
| H04W 88/06 | (2009.01) |
| H04W 84/12 | (2009.01) |
| H04W 40/12 | (2009.01) |
| H04W 36/00 | (2009.01) |
| H04W 28/18 | (2009.01) |
| H04W 36/14 | (2009.01) |

(52) U.S. Cl.
CPC ........ *H04W 36/0066* (2013.01); *H04W 36/14* (2013.01); *H04W 40/12* (2013.01); *H04W 84/12* (2013.01); *H04W 88/06* (2013.01)

(56) References Cited

U.S. PATENT DOCUMENTS

| | | | |
|---|---|---|---|
| 2013/0031271 | A1 | 1/2013 | Bosch et al. |
| 2013/0242897 | A1 | 9/2013 | Meylan et al. |
| 2013/0308445 | A1 | 11/2013 | Xiang et al. |
| 2014/0079022 | A1 | 3/2014 | Wang et al. |
| 2014/0092731 | A1 | 4/2014 | Gupta |
| 2014/0092742 | A1 | 4/2014 | Chou |
| 2014/0153511 | A1 | 6/2014 | Sirotkin |
| 2014/0233386 | A1 | 8/2014 | Jamadagni et al. |
| 2015/0195743 | A1 | 7/2015 | Sirotkin et al. |
| 2015/0195759 | A1 | 7/2015 | Sirotkin et al. |
| 2015/0327139 | A1 | 11/2015 | Sirotkin et al. |
| 2015/0382281 | A1 | 12/2015 | Sirotkin |
| 2016/0021570 | A1 | 1/2016 | Sirotkin et al. |
| 2016/0044550 | A1* | 2/2016 | Lee .................. H04W 36/0066 370/331 |

FOREIGN PATENT DOCUMENTS

| | | |
|---|---|---|
| RU | 2421941 C2 | 6/2011 |
| WO | 2012/040251 A2 | 3/2012 |
| WO | WO 2014/113103 A1 | 7/2014 |
| WO | WO2014163696 A1 | 10/2014 |
| WO | WO 2014/182341 A1 | 11/2014 |

OTHER PUBLICATIONS

Office Action dated Mar. 28, 2016 from Taiwan Patent Application No. 104110683, 11 pages.
"3GPP, ""Evolved Universal Terrestrial Radio Access (E-UTRA); Radio Resource Control (RRC); Protocol specification (Release 12),"" 3GPP TS 36.331 V12.1.0 (Mar. 2014), Mar. 19, 2014, Lte Advanced, 356 pages".
"3GPP, ""Evolved Universal Terrestrial Radio Access (E-UTRA); Radio Resource Control (RRC); Protocol specification (Release 12),"" 3GPP TS 36.331 V12.3.0 (Sep. 2014), Sep. 23, 2014, Lte Advanced, 221 pages".
3GPP, "Evolved Universal Terrestrial Radio Access (E-UTRA); User Equipment (UE) procedures in idle mode (Release 12)," 3GPP TS 36.304 V12.0.0 (Mar. 2014), Mar. 19, 2014, Lte Advanced, 34 pages.
3GPP, "Evolved Universal Terrestrial Radio Access (E-UTRA); User Equipment (UE) procedures in idle mode (Release 12)," 3GPP TS 36.304 V12.2.0 (Sep. 2014), Sep. 23, 2014, Lte Advanced, 37 pages.
3GPP, "Evolved Universal Terrestrial Radio Access (E-UTRA) and Evolved Universal Terrestrial Radio Access Network (E-UTRAN); Overall description; Stage 2 (Release 12)," 3GPP TS 36.300 V12.1.0 (Mar. 2014), Mar. 19, 2014, Lte Advanced, 209 pages.
3GPP, "Evolved Universal Terrestrial Radio Access (E-UTRA) and Evolved Universal Terrestrial Radio Access Network (E-UTRAN); Overall description; Stage 2 (Release 12)," 3GPP TS 36.300 V12.3.0 (Sep. 2014), Sep. 23, 2014, Lte Advanced, 215 pages.
3GPP, "Study on Wireless Local Area Network (WLAN)—3GPP radio interworking (Release 12)," 3GPP TR 37.834 V12.0.0 (Dec. 2013), Jan. 7, 2014, Lte Advanced, 17 pages.
3GPP, T"echnical Specification Group Radio Access Network; Study on WLAN/3GPP radio interworking (Release 12)," 3GPP TR 37.834 V1.3.0 (Nov. 2013), Feb. 26, 2014, Lte Advanced, 19 pages.
LG Electronics, Inc., "Comparison of access network selection solutions," 3GPP TSG RAN2 Meeting #82, R2-132055, Agenda item: 5.1.1, May 20-May 24, 2013, Fukuoka, Japan, 6 pages.
3GPP, "Technical Specification Group Services and System Aspects; 3GPP System Architecture Evolution (SAE); Security architecture (Release 12)," 3GPP TS 33.401 V12.10.0 (Dec. 2013), Dec. 20, 2013, Lte Advanced, 121 pages.
3GPP, "Technical Specification Group Radio Access Network; Evolved Universal Terrrestial Radio Access (E-UTRA); User Equipment (UE) procedures in idle mode (Release 12)," 3GPP TS 36.304 V12.0.0 (Mar. 2014); Mar. 19, 2014, Lte Advanced; 34 pages.
Intel Corporation, "Stage-2 details of WLAN/3GPP Radio Interworking for LTE," 3GPP TSG-RAN WG2 Meeting #85bis, R2-141617, Current version: 12.1.0, Work item code: UTRA_LTE_WLAN_interw-Core, Mar. 31-Apr. 4, 2014, Valencia, Spain, 8 pages.
Intel Corporation, "Idle mode procedures of WLAN/3GPP Radio Interworking for LTE" 3GPP TSG-RAN WG2 Meeting #85bis, R2-141756, Current version: 12.0.0, Work item code: UTRA_LTE_WLAN_interw-Core, Mar. 31-Apr. 4, 2014, Valencia, Spain, 4 pages.
3GPP, "Technical Specification Group Radio Access Network; Study on WLAN/3GPP radio interworking (Release 12)," 3GPP TR 37.834 V1.3.0 (Nov. 2013), Lte Advanced, 20 pages.
3GPP, "UTRAN: General Description; Stage 2 (Release 12)," 3GPP TS 25.300 V0.1.0 (Feb. 2014), Feb. 26, 2014, 5 pages.
3GPP, "Umiversal Terrestrial Radio Access Network (UTRAN); General description; Stage 2 (Release 12)," 3GPP TS 25.300 V12.2.0 (Sep. 2014), Sep. 23, 2014, 12 pages.
3GPP, "User Equipment (UE) procedures in idle mode and procedures for cell reselection in connected mode (Release 12),"3GPP TS 25.304 V12.1.0 (Mar. 2014), Mar. 19, 2014, 54 pages.
3GPP, "User Equipment (UE) procedures in idle mode and procedures for cell reselection in connected mode (Release 12)," 3GPP TS 25.304 V12.3.0 (Sep. 2014), Sep. 26, 2014, 58 pages.
3GPP, "Radio Resource Control (RRC); Protocol specification (Release 12)," 3GPP TS 25.331 V12.1.0 (Mar. 2014), Mar. 20, 2014, Sections: 8.1.1.1.2, 8.1.1.6.23, 8.2.2.3, 8.3.1.12, 8.5.2, 8.6.7.29, 8.6.7.30, 10.1.1, 10.2.8, 10.2.48.8.26, 10.2.62, 10.3.8.18c, 10.3.9b, 10.3.10, 11.2, 11.3, 11.4, 13.1, 13.4.32, 13.4.69, 13.4.70, 13.5.2; pp. 2,120.
3GPP, "Radio Resource Control (RRC); Protocol specification (Release 12)," 3GPP TS 25.331 V12.3.0 (Sep. 2014), Sep. 23, 2014, Sections: 8.1.1.1.2, 8.1.1.6.23, 8.2.2.3, 8.3.1.12, 8.5.2, 8.6.7.29, 8.6.7.30, 10.1.1, 10.2.8, 10.2.48.8.26, 10.2.62, 10.3.8.18c, 10.3.9b, 10.3.10, 11.2, 11.3, 11.4, 13.1, 13.4.32, 13.4.69, 13.4.70, 13.5.2; pp. 2,204.
International Search Report and Written Opinion dated Aug. 17, 2015 from International Application No. PCT/US2015/029740.
Office Action dated Mar. 2, 2017 from Russian Patent Application No. 2016133746 , 7 pages.
Examiner's Report dated May 29, 2017 from Canadian Patent Application No. 2,937,910, 6 pages.
Notice of Preliminary Rejection dated Jun. 14, 2017 from Korean Patent Application No. 10-2016-7022635, 15 pages.
Alcatel-Lucent et al., "RAN parameters for traffic steering," 3GPP TSG-RAN WG RAN3#84, R2-134329, Agenda item: 5.1., Nov. 7-11, 2013, San Francisco, USA, 4 pages.
LG Electronics Inc., "Handling of the dedicated RAN assistance information," 3GPP TSG-RAN2 Meeting #85bis, R2-141702, Agenda item: 5.1.2, Mar. 31-Apr. 4, 2014, Valencia, Spain, 3 pages.
Examination Report dated Jul. 7, 2017 from Australian Patent Application No. 2015256474, 4 pages.

(56) References Cited

OTHER PUBLICATIONS

Notice of Preliminary Rejection dated Jul. 18, 2017 from Korean Patent Application No. 10-2016-7027715, 21 pages.

Office Action and Search Report dated Jul. 5, 2017 from Taiwan Divisional Application No. 105137651, 33 pages.

Office Action dated Aug. 1, 2017 from Russian Patent Application No. 201639434, 7 pages.

Examiner's Report dated Jul. 17, 2017 from Canadian Patent Application No. 2,945,065, 7 pages.

Examination Report dated Aug. 21, 2017 from Australian Patent Application No. 2015255871, 8 pages.

Zte, "Further Consideration on Offloading Evaluation with RAN Assistance Parameters," 3GPP TSG-RAN WG2 Meeting #85bis, R2-141324, Agenda item: 5.1.2, Mar. 31-Apr. 4, 2014, Valencia, Spain, 4 pages.

Intel, "Introduction of WLAN/3GPP radio interworking functionality into specifications for LTE and UMTS," 3GPP TSG-RAN 2 Meeting #85bis, R2-141627, Agenda item: 5.1.2, Mar. 31st-Apr. 4th, 2014, Valencia, Spain, 4 pages.

Alcatel-Lucent et al, "Analysis of Solution 1 ," 3GPP TSG-RAN WG2#82, R2-132018, Agenda Item: 5.1.1, May 20th-24th, 2013, Fukuoka, Japan, 4 pages.

Siris et al, "Performance and Energy Efficiency of Mobile Data Offloading with Mobility Prediction and Prefetching," World of Wireless, Mobile and Multimedia Networks (WoWMoM), 2013 IEEE 14th International Symposium and Workshops pm a. IEEE, 2013, Jun. 4-7, 2013 Section I, II, III, 6 pages.

Notice of Reasons for Rejection dated Sep. 19, 2017 from Japanese Patent Application No. 2016-549356, 16 pages.

Intel Corporation, "Connected mode procedures and RRC signaling of WLAN/3GPP Radio Interworking for LTE," 3GPP TSG-RAN WG2 Meeting #85bis, R2-141757, Current version: 12.1.0, Work item code: UTRA_LTE_WLAN_interw-Core, Mar. 31st-Apr. 4th, 2014, Valencia, Spain, 16 pages.

Office Action dated Oct. 17, 2017 from Japanese Patent Application No. 2016-565046, 7 pages.

Intel Corporation, "Connected mode procedures and RRC signaling of WLAN/3GPP Radio Interworking for LTE," 3GPP TSG-RAN WG2 Meeting #85bis, R2-141625, Change Request 36331, CR CRNUm, rev Current version: 12.1.0, Mar. 31st-Apr. 4th, 2014, Valencia, Spain, 9 pages.

\* cited by examiner

SYSTEMS, DEVICES, AND METHODS FOR INTERWORKING BETWEEN A UNIVERSAL MOBILE TELECOMMUNICATIONS SYSTEM (UMTS) NETWORK AND A WIRELESS LOCAL AREA NETWORK (WLAN)

CROSS-REFERENCE TO RELATED APPLICATION

This application claims the benefit of U.S. Provisional Application No. 61/969,790 filed Mar. 24, 2014, entitled "Stage-2 and Stage-3 Details of UMTS/WLAN Radio Interworking," U.S. Provisional Application No. 61/990,693 filed May 8, 2014, entitled "Stage-2 and Stage-3 Details of UMTS/WLAN Radio Interworking," and U.S. Provisional Application No. 62/029,936 filed Jul. 28, 2014, entitled "Amendment to WLAN/3GPP Interworking RAN Rules." The entirety of the above-listed applications are hereby incorporated herein by reference.

FIELD

Embodiments of the present disclosure generally relate to the field of wireless communication, and more particularly, to systems, devices, and methods for universal mobile telecommunications system (UMTS) and wireless local area interworking.

BACKGROUND

A cellular network may direct a user equipment (UE) to transfer network traffic to a wireless local area network (WLAN). Transferring the network traffic to the WLAN offloads the traffic from the cellular network, thereby freeing up resources on the cellular network for other UEs.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

In the following detailed description, reference is made to the accompanying drawings, which form a part hereof wherein like numerals designate like parts throughout, and in which is shown by way of illustration embodiments that may be practiced. It is to be understood that other embodiments may be utilized and structural or logical changes may be made without departing from the scope of the present disclosure.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed or described operations may be omitted in additional embodiments.

For the purposes of the present disclosure, the term "or" is used as an inclusive term to mean at least one of the components coupled with the term. For example, the phrase "A or B" means (A), (B), or (A and B); and the phrase "A, B, or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group), or memory (shared, dedicated, or group) that execute one or more software or firmware programs, a combinational logic circuit, or other suitable hardware components that provide the described functionality.

Figure 1:
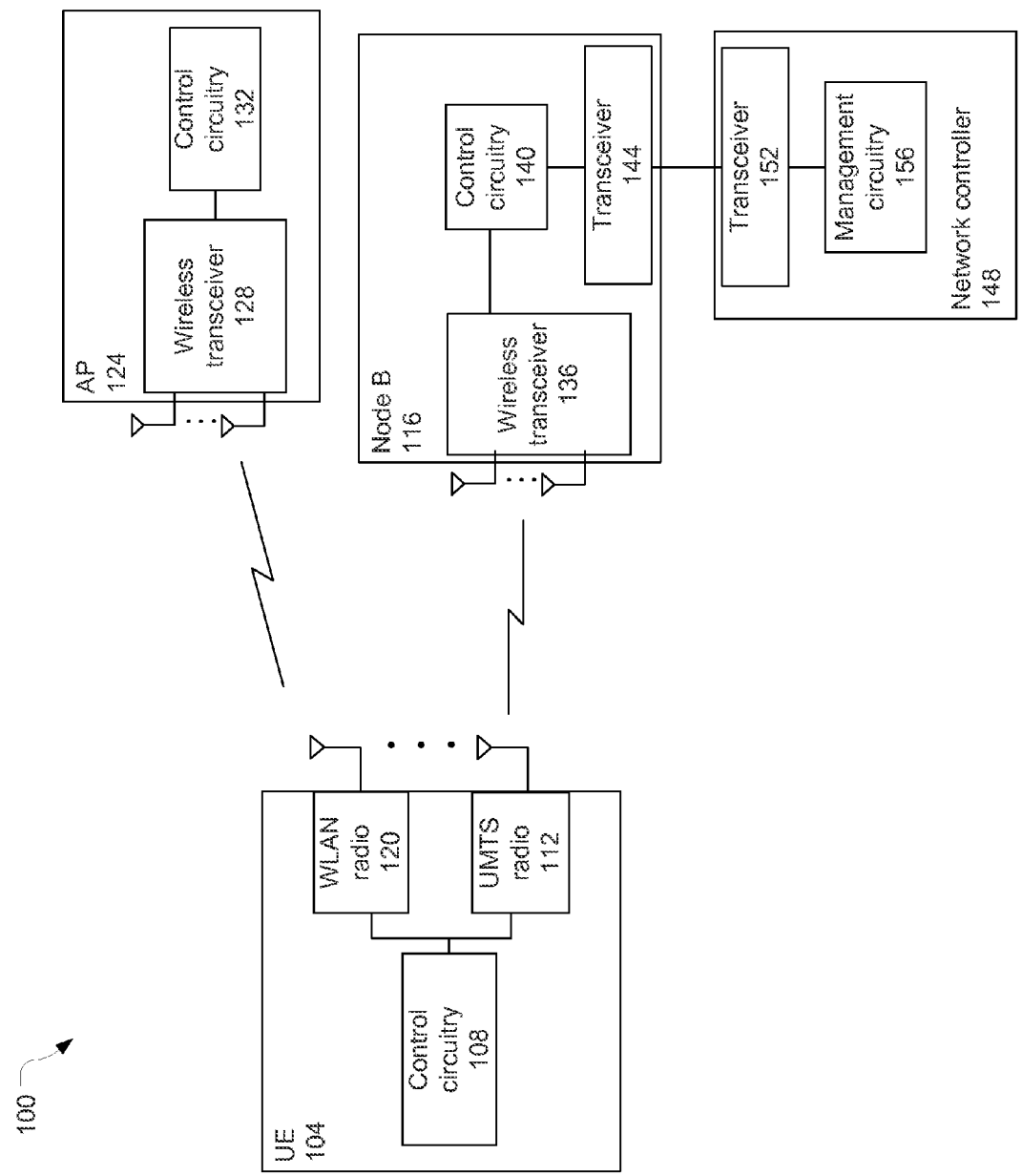
FIG. 1 schematically illustrates a wireless communication environment in accordance with various embodiments.

FIG. 1 schematically illustrates a wireless communication environment 100 in accordance with various embodiments. The environment 100 may include a user equipment (UE) 104 that is capable of communicating over at least two wireless communication networks, including a cellular network and a wireless local area network (WLAN). The cellular network may be, for example, universal terrestrial radio access network (UTRAN) in accordance with a 3rd Generation Partnership Project (3GPP) universal mobile telecommunications system (UMTS) protocol. The UE 104 may include control circuitry 108 coupled with a UMTS radio 112 and a WLAN radio. 120. The UE 104 may use the UMTS radio 112 to wirelessly communicate with one or more nodes of the UTRAN, for example, Node B 116. The UE 104 may use the WLAN radio 120 to wirelessly communicate with one or more nodes of the WLAN, for example, access point (AP) 124.

The AP 124 may include wireless transceiver 128 coupled with control circuitry 132. The control circuitry 132 may control operation and communication of the AP 124. In some embodiments the control circuitry 132 may control communications over the wireless transceiver 128 and one or more additional transceivers, which may be wired or wireless.

The Node B 116 may also include a wireless transceiver 136 and control circuitry 140. The control circuitry 140 may control operation and communication of the Node B 116. The Node B 116 may be part of the UTRAN and may include transceiver 144 to communicate with one or more nodes of the UTRAN, for example, network controller 148. The eNB 116 may include one or more additional transceivers, which may be wired or wireless.

The network controller 148 may include a transceiver 152 to communicate with the transceiver 144 of the Node B 116.

The network controller 148 may further include management circuitry 156 coupled to the transceiver 152. In some embodiments, the network controller 148 may manage a plurality of Node Bs 116 of the UTRAN. Alternatively, or additionally some or all of the network controller 148 (e.g., some or all of the management circuitry 156) may be included in the Node B 116.

The network controller 148 may be part of the UTRAN along with the Node B 116, another UTRAN, or an Evolved Packet Core (EPC) that is coupled with the UTRAN of the Node B 116. The EPC may include an access network discovery and selection function (ANDSF) to assist UEs to discover non-3GPP access networks that can be used for data communication in addition to 3GPP access networks, and provide the UE with rules policing the connection to these networks. The EPC may also provide a communication interface between various radio access networks (RANs) and other networks. For example, the EPC may provide a communication interface between the UTRAN and the WLAN described herein.

Various embodiments provide RAN-assisted UE-based bidirectional traffic steering between the UTRAN and one or more WLANs. In various embodiments, the management circuitry 156 of the network controller 148 may transmit (e.g., via the Node B 116) RAN parameter information to the UE 104 for use by the UE 104 for traffic steering between the UTRAN and a WLAN. The RAN parameter information may include one or more RAN assistance parameters. The RAN assistance parameters may include one or more thresholds for use by the UE 104 for traffic steering between the UTRAN and the WLAN. In some embodiments, the RAN assistance parameters may further include one or more WLAN identifiers and/or an offload preference indicator (OPI). The WLAN identifiers may identify APs and/or WLANs that are available to the UE 104 for traffic steering.

The OPI may be used for one or more ANDSF policies for the UE 104. For example, an ANDSF server may provide multiple sets of ANDSF policies to the UE 104. The network may use the OPI to indicate to the UE 104 which ANDSF policy the UE 104 should currently use.

The RAN assistance parameters may be transmitted to the UE 104 via broadcast signaling (that is directed to a plurality of UEs) and/or dedicated signaling (that is designated for the UE 104). For example, the RAN assistance parameters may be included in a system information block (SIB) that is transmitted via broadcast signaling. Additionally, or alternatively, the RAN assistance parameters may be included in a UTRAN mobility information message or a cell update confirm message that is dedicated to the UE 104.

In various embodiments, the control circuitry 108 of the UE 104 may receive the RAN assistance parameters. The control circuitry 108 may steer traffic between the UMTS radio and the WLAN radio based on the thresholds. The control circuitry 108 may steer traffic between the UMTS radio and the WLAN radio based on one or more traffic steering rules that use the thresholds, as further discussed below. In some embodiments, the RAN assistance parameters may further include a timer value used in evaluation of traffic steering rules. For example, the timer value may indicate a length of time during which the traffic steering rules must be satisfied before initiating traffic steering between the UTRAN and the WLAN.

In some embodiments, the UE 104 may steer traffic between the UTRAN and WLAN when in one or more radio resource control (RRC) states with the Node B 116, such as an idle mode, a CELL_DCH state, a CELL_FACH state, a CELL_PCH state, or a URA_PCH state.

In some embodiments, if the UE 104 is provisioned with ANDSF policies, it may forward the current RAN assistance parameters to upper layers of the UE. In some embodiments, if the UE 104 is in idle mode and the UE 104 receives the broadcast RAN assistance parameters while the validity timer is still running, the UE may not forward the received parameters, but rather the stored parameters that were previously received via dedicated signaling (if any). If the UE 104 is not provisioned with ANDSF policies, the UE 104 may use the RAN assistance parameters for traffic steering according to the traffic steering rules discussed further below.

In some embodiments, the UE 104 may receive RAN assistance parameters via broadcast signaling and via dedicated signaling. In such situations, the UE 104 may use the RAN assistance parameters received via dedicated signaling and may not use the RAN assistance parameters received via broadcast signaling. Some behavior of the UE 104 with respect to the RAN assistance parameters may depend on the RRC state of the UE 104.

For example, in some embodiments, if the UE 104 is in the CELL_DCH state, the UE 104 may use the parameters obtained via dedicated signaling only, and may not use the RAN assistance parameters obtained via broadcast signaling. The UE 104 may keep the RAN assistance parameters, that were obtained via dedicated signaling, upon handover from a serving cell to a target cell of the UTRAN (e.g., handover from the Node B 116 to another Node B of the UTRAN) if the RAN assistance parameters are not reconfigured or deleted by the UTRAN during the handover. The UE 104 may discard the RAN assistance parameters obtained via broadcast signaling when the UE 104 enters the CELL_DCH state. Additionally, or alternatively, the UE 104 may discard the RAN assistance parameters obtained via dedicated signaling upon serving radio network subsystem (SRNS) relocation.

In some embodiments, if the UE 104 is in the CELL_FACH state, the UE 104 may apply the RAN assistance parameters obtained via dedicated signaling for traffic steering instead of the RAN assistance parameters obtained via broadcast signaling, if the UE 104 has received RAN assistance parameters via dedicated signaling from the serving cell. If the UE 104 has not received RAN assistance parameters via dedicated signaling from the serving cell, the UE 104 may apply the RAN assistance parameters obtained via broadcast signaling for traffic steering. The UE 104 in the CELL_FACH state may discard the dedicated parameters upon cell reselection (e.g., to select a new cell as the serving cell). Accordingly, the UE 104 may use the RAN assistance parameters obtained via broadcast signaling until or unless the UE 104 receives RAN assistance parameters from the new serving cell.

In some embodiments, if the UE 104 is in the idle mode, the CELL_PCH state, or the URA_PCH state, the UE 104 may apply the RAN assistance parameters obtained via dedicated signaling. If the UE 104 has not received RAN assistance parameters via dedicated signaling, the UE 104 may apply the RAN assistance parameters obtained via broadcast signaling. Upon cell reselection, the UE 104 may discard the RAN assistance parameters obtained via dedicated signaling, and may use the RAN assistance parameters obtained via broadcast signaling until new RAN assistance parameters are obtained via dedicated signaling.

When the UE 104 enters the idle mode, the UE 104 may start a timer. The UE 104 may use the RAN assistance parameters received via dedicated signaling until the timer expires. When the timer expires, the UE 104 may discard the RAN assistance parameters obtained via dedicated signaling and apply the RAN assistance parameters obtained via broadcast signaling. In some embodiments, the UE 104 may additionally or alternatively use the timer in other RRC states, such as the CELL_PCH state or the URA_PCH state.

In some embodiments, the UTRAN may be shared by a plurality of public land mobile networks (PLMNs). In some such embodiments, individual PLMNs that share the UTRAN may transmit independent sets of RAN assistance parameters.

In various embodiments, the RAN assistance parameters may include a first set of thresholds that are to be used by the UE 104 for steering traffic from the UTRAN to the WLAN, and a second set of thresholds that are to be used by the UE 104 for steering traffic from the WLAN to the UTRAN. The thresholds of the first and second sets of thresholds may include one or more of a UTRAN signal strength threshold, a UTRAN signal quality threshold, a WLAN utilization threshold, a WLAN backhaul data rate threshold (uplink and/or downlink), and/or a WLAN beacon received signal strength indicator (RSSI) threshold. As discussed above, the RAN assistance parameters may further include one or more WLAN identifiers (used in access network selection and traffic steering rules), an OPI (used in ANDSF policies), and/or a timer value (used in the traffic steering rules). The UE 104 may use the RAN assistance parameters in the evaluation of the traffic steering rules, described herein, to perform traffic steering decisions between EUTRAN and WLAN.

For example, the first set of thresholds for traffic steering from the UTRAN to the WLAN may include a low UTRAN received signal quality threshold ($Thresh_{ServingOffloadWLAN,\ LowQ}$), a low UTRAN received signal power threshold ($Thresh_{ServingOffloadWLAN,\ LowP}$), a low WLAN channel utilization threshold ($Thresh_{ChUtilWAN,\ Low}$), a high WLAN downlink backhaul rate threshold ($Thresh_{BackhRateDlWLAN,\ High}$), a high WLAN uplink backhaul rate threshold ($Thresh_{BackhRateUlWLAN,\ High}$), and/or a high beacon received signal strength indicator (RSSI) threshold ($Thresh_{RSSIWLAN,\ High}$). The second set of thresholds for traffic steering from the WLAN to the UTRAN may include a high UTRAN received signal quality threshold ($Thresh_{ServingOffloadWLAN,\ HighQ}$), a high UTRAN received signal power threshold ($Thresh_{ServingOffloadWLAN,\ HighP}$), a high WLAN channel utilization threshold ($Thresh_{ChUtilWLAN,\ High}$), a low WLAN downlink backhaul rate threshold ($Thresh_{BackhRateDlWLAN,\ Low}$), a low WLAN uplink backhaul rate threshold ($Thresh_{BackhRateUlWLAN,\ Low}$), and/or a low beacon RSSI threshold ($Thresh_{RSSIWLAN,\ Low}$). A "high" threshold of one set of thresholds may generally have a greater value than a corresponding "low threshold" of the other set of thresholds. Accordingly, the corresponding thresholds of the two sets of thresholds may have different values to avoid/reduce frequent switching between the UTRAN and the WLAN (e.g., the "ping-pong effect").

In some embodiments, the threshold $Thresh_{ServingOffloadWLAN,\ LowP}$ may specify a common pilot channel (CPICH) received signal code power (RSCP) threshold (measured in dBm) for frequency-division duplexing (FDD) cells of the UTRAN and/or a primary common control physical channel (P-CCPCH) RSCP for time-division duplexing (TDD) cells of the UTRAN for use by the UE 104 for traffic steering to the WLAN. The threshold $Thresh_{ServingOffloadWLAN,\ HighP}$ may specify the CPICH RSCP for FDD cells and/or a P-CCPCH RSCP for TDD cells for use by the UE 104 for traffic steering to the UTRAN. The threshold $Thresh_{ServingOffloadWLAN,\ LowQ}$ may specify the CPICH $E_c/N_0$ (quality energy per chip over total received power spectral density) for FDD cells for use by the UE 104 for traffic steering to the WLAN. The threshold $Thresh_{ServingOffloadWLAN,\ HighQ}$ may specify the CPICH $E_c/N_0$ for FDD cells for use by the UE 104 for traffic steering to the UTRAN.

In some embodiments, $Thresh_{ChUtilWAN,\ Low}$ may be a WLAN channel utilization (BSS load) threshold used by the UE 104 for traffic steering to WLAN, and $Thresh_{ChUtilWLAN,\ High}$ may be a WLAN channel utilization (BSS load) threshold used by the UE 104 for traffic steering to UTRAN. The WLAN channel utilization for an indicated WLAN identifier may correspond to a WLAN channel utilization value from basic service set (BSS) load information element (IE) obtained from IEEE 802.11 (Beacon or Probe Response) signaling for the indicated WLAN identifier.

In some embodiments, $Thresh_{BackhRateDlWLAN,\ High}$ corresponds to a backhaul available downlink bandwidth threshold used by the UE 104 for traffic steering to WLAN, and $Thresh_{BackhRateDlWLAN,\ Low}$ may be a backhaul available downlink bandwidth threshold used by the UE 104 for traffic steering to UTRAN. The backhaul available downlink bandwidth for the WLAN may be calculated as Downlink Speed*(1−Downlink Load/255), where the Downlink Speed and Downlink Load parameters may be drawn from wide area network (WAN) Metrics element obtained via access network query protocol (ANQP) signaling from Wi-Fi Alliance (WFA) hotspot (HS) 2.0 (based on IEEE 802.11u and WFA extensions).

In some embodiments, $Thresh_{BackhRateUlWLAN,\ High}$ may be a backhaul available uplink bandwidth threshold used by the UE 104 for traffic steering to WLAN, and $Thresh_{BackhRateUlWLAN,\ Low}$ may be a backhaul available uplink bandwidth threshold used by the UE 104 for traffic steering to UTRAN. The backhaul available uplink bandwidth that may be calculated as Uplink Speed*(1−Uplink Load/255), where the Uplink Speed and Uplink Load parameters may be drawn from the WAN metrics element obtained via ANQP signaling from WFA HS2.0, In some embodiments, $Thresh_{RSSIWLAN,\ High}$ corresponds to a Beacon RSSI threshold used by the UE 104 for traffic steering to WLAN, and $Thresh_{RSSIWLAN,\ Low}$ may be a Beacon RSSI threshold used by the UE 104 for traffic steering to UTRAN. The Beacon RSSI for a WLAN may be an RSSI as measured by the UE 104 on the WLAN Beacon.

In some embodiments, the WLAN identifiers may identify target WLANs, for example the WLAN associated with the AP 124, to which traffic may be steered. The WLAN identifiers may include service set identifiers (SSIDs), basic service set identifiers (BSSIDs), and/or homogeneous extended service set identifiers (HHIDs). The traffic steering rules may be applicable to the target WLANs. In some embodiments, these traffic steering rules may only be applicable if the UE 104 is capable of traffic steering between UTRAN and WLAN and the UE 104 is not provisioned with active ANDSF policies as described above.

A first set of traffic steering rules may describe situations in which traffic may be steered from a UTRAN to a WLAN. These situations may be based on measured or otherwise obtained operational states in the UTRAN and the WLAN as compared to various thresholds provided in the RAN assistance parameters. In some embodiments, if the first set of traffic steering rules are met (e.g., for the time interval indicated by the timer value TsteeringWLAN), then an access stratum in the control circuitry 108 may indicate to upper layers of the control circuitry 108, for example, a non-access stratum, when and for which WLAN identifiers (out of a list of WLAN identifiers provided in the RAN access parameters) the first set of traffic steering rules have been met.

The control circuitry 108 (e.g., the upper layers of the control circuitry 108) may steer traffic from the UTRAN to the WLAN based on the indication that the conditions are satisfied. In some embodiments, the higher layers may ignore the indication provided by the access stratum if it contradicts user preferences or if the UE 104 is provisioned with active ANDSF policies.

The first set of traffic steering rules for steering traffic to a WLAN may include UTRAN serving cell conditions and target WLAN conditions. The EUTRAN serving cell conditions may include: $Qrxlevmeas < Thresh_{ServingOffloadWLAN, LowP}$; or $Qqualmeas < Thresh_{ServingOffloadWLAN, LowQ}$. The value Qrxlevmeas may be a received signal power of the UTRAN cell (e.g., the CPICH RSCP for an FDD cell or the P-CCPCH RSCP for a TDD cell). The value Qqualmeas may be a measured reference signal received quality (RSRQ) (in dB) in the UTRAN cell (e.g., the CPICH $E_c/N_0$ for an FDD cell). Thus, the control circuitry 108 may determine that the UTRAN serving cell conditions of the first set of traffic steering rules are satisfied if a measured received signal power value of the UTRAN cell is less than the corresponding received signal power threshold or a measured received signal quality value of the UTRAN is less than the corresponding received signal quality threshold. In some embodiments, the received signal power value and/or the received signal quality value may be measured by the UE 104.

The target WLAN conditions may include: $ChannelUtilizationWLAN < Thresh_{ChUtilWAN, Low}$; $BackhaulRateDlWLAN > Thresh_{BackhRateDlWLAN, High}$; $BackhaulRateUlWLAN > Thresh_{BackhRateDlWLAN, High}$; and $BeaconRSSI > Thresh_{RSSIWLAN, High}$, where ChannelUtilizationWLAN may be the WLAN channel utilization value from a BSS IE obtained from IEEE 802.11 (Beacon or Probe Response) signaling for an indicated WLAN identifier, BackhaulRateDlWLAN may be a backhaul available downlink bandwidth that may be calculated as Downlink Speed*(1−Downlink Load/255), where the Downlink Speed and Downlink Load parameters may be drawn from WAN Metrics element obtained via ANQP signaling from WFA HS 2.0 (based on IEEE 802.11u and WFA extensions), BackhaulRateUlWLAN may be a backhaul available uplink bandwidth that may be calculated as Uplink Speed*(1−Uplink Load/255), where the Uplink Speed and Uplink Load parameters may be drawn from the WAN metrics element obtained via ANQP signaling from WFA HS2.0, and BeaconRSSI may be an RSSI as measured by the UE 104 on the WLAN Beacon. Thus, the control circuitry 108 may determine that the WLAN conditions are satisfied if a WLAN channel utilization is less than the corresponding WLAN channel utilization threshold, a WLAN downlink backhaul rate is greater than a corresponding WLAN downlink backhaul rate threshold, a WLAN uplink backhaul rate is greater than a corresponding WLAN uplink backhaul rate threshold, and a beacon RSSI is greater than a corresponding WLAN beacon RSSI threshold.

In some embodiments, the UE 104 may receive only a subset of the thresholds discussed herein. In such embodiments, the control circuitry 108 of the UE 104 may exclude the evaluation of a measurement for which a corresponding threshold has not been provided. Accordingly, the network controller 148 may select the conditions that are to be used for traffic steering by selecting which thresholds to include in the RAN assistance parameters.

In an embodiment in which more than one target WLAN meets the conditions above, it may be up to the UE 104 to choose one of the available target WLANs. In some embodiments, each of the target WLANs may have an associated priority by which the UE 104 selects the WLAN with which to associate. The associated priority may be transmitted with the WLAN identifiers in the RAN assistance parameters. In other embodiments, the target WLANs may not have associated priorities, and the UE 104 may select one of the target WLANs based on one or more other considerations or at random.

A second set of the traffic steering rules may describe situations in which traffic may be steered from a WLAN to an UTRAN cell. Similar to the above discussion, these situations may be based on operational states in the WLAN and UTRAN cell as compared to various thresholds provided in the RAN assistance parameters. In some embodiments, if predefined conditions are met, then an access stratum in the control circuitry 108 may indicate to upper layers of the control circuitry 108, for example, a non-access stratum, when certain conditions for steering traffic from a WLAN to an EUTRAN cell are satisfied for a predetermined time interval, TsteeringWLAN. In some embodiments, the time interval used for traffic steering from the WLAN to the UTRAN may be the same as the time interval used for traffic steering from the UTRAN to the WLAN. In other embodiments, the RAN assistance parameters may include separate timer values to indicate respective time intervals for traffic steering to a UTRAN and for traffic steering to a WLAN. The control circuitry 108 (e.g., the upper layers of the control circuitry 108) may steer traffic from the WLAN to the UTRAN based on the indication that the conditions are satisfied. In some embodiments, the higher layers may ignore the indication provided by the access stratum if it contradicts user preferences or if the UE 104 is provisioned with ANDSF policies.

The second set of traffic steering rules for steering traffic to a WLAN may include WLAN conditions conditions and target UTRAN cell conditions. The WLAN conditions for steering traffic to a target UTRAN cell from the WLAN may include: $ChannelUtilizationWLAN > Thresh_{ChUtilWLAN, High}$; $BackhaulRateDlWLAN < Thresh_{BackhRateDlWLAN, Low}$; $BaCkhaulRateUlWLAN < Thresh_{BackhRateUlWLAN, Low}$; or $BeaconRSSI < Thresh_{RSSIWLAN, Low}$. Thus, the control circuitry 108 may determine the WLAN conditions for steering traffic to the target UTRAN cell are satisfied if a WLAN channel utilization is greater than a corresponding WLAN channel utilization threshold, a WLAN downlink backhaul rate is less than a corresponding WLAN downlink backhaul rate threshold, a WLAN uplink backhaul rate is less than a corresponding WLAN uplink backhaul rate threshold, or a beacon RSSI is less than a corresponding WLAN beacon RSSI threshold.

The UTRAN conditions for steering traffic to a target UTRAN cell from a WLAN may include: $Qrxlevmeas > Thresh_{ServingOffloadWLAN, HighP}$; and $Qqualmeas > Thresh_{ServingOffloadWLAN, HighQ}$. Thus, the control circuitry 108 may determine the UTRAN conditions for steering traffic to the target UTRAN cell are satisfied if a measured received signal power value of the UTRAN is greater than a corresponding received signal power threshold and a measured received signal quality value of the UTRAN is greater than a corresponding received signal quality threshold.

As discussed above, the RAN assistance parameters may be included in a system information message (e.g., in one or more SIBs). In some embodiments, the RAN assistance parameters may be transmitted in SystemInformationBlock- Type23 and SystemInformationBlockType24. In one example, the various thresholds of the RAN assistance parameters may be included in SystemInformationBlockType23 and the list of target WLAN identifiers may be included in SystemInformationBlockType24. The SystemInformationBlockType23 and SystemInformationBlockType24 may have properties according to Table 1 below. In other embodiments, both the thresholds and the list of target WLAN identifiers may be included in SystemInformationBlockType23.

TABLE 1

| System information block | Area scope | UE mode/state when block is valid | UE mode/state when block is read | Scheduling information | Modification of system information |
|---|---|---|---|---|---|
| System information block type 23 | Cell | Idle mode, CELL_FACH, CELL_PCH, URA_PCH | Idle mode, CELL_FACH, CELL_PCH, URA_PCH | Specified by the IE "Scheduling information" | Value tag |
| System information block type 24 | Cell | Idle mode, CELL_FACH, CELL_PCH, URA_PCH | Idle mode, CELL_FACH, CELL_PCH, URA_PCH, | Specified by the IE "Scheduling information" | Value tag |

In some embodiments, SystemInformationBlockType23 may contain parameters for traffic steering between UTRAN and WLAN as shown in Table 2.

| Information Element/Group name | Need | Multi | Type and reference | Semantics description | Version |
|---|---|---|---|---|---|
| CHOICE WLAN Offload Parameters | MP | | | | REL-12 |
| >WLAN Offload Parameters Common | | | WLAN Offload Parameters 10.3.3.x1 | | REL-12 |
| >WLAN Offload Parameters Per PLMN List | | 1 to 6 | | The number of instances of this IE is the number of instances of the IE "Multiple PLMNs" in the IE "Multiple PLMN List" of the MIB plus one. The first instance of this IE specifies the WLAN Offload Parameters for UEs which have chosen the PLMN in the IE "PLMN identity" of the MIB, the second instance specifies the WLAN Offload Parameters for UEs which have chosen the first PLMN in the IE "Multiple PLMNs" in the IE "Multiple PLMN List" of the MIB, the third instance specifies the WLAN Offload Parameters for UEs which have chosen the second PLMN in the IE "Multiple PLMNs" in the IE "Multiple PLMN List" of the MIB, and so on. | REL-12 |
| >>WLAN Offload Parameters | OP | | WLAN Offload Parameters 10.3.3.x1 | | REL-12 |

In some embodiments, SystemInformationBlockType24 may contain the list of WLAN identifiers, as shown in Table 3.

TABLE 3

| Information Element/Group name | Need | Multi | Type and reference | Semantics description | Version |
|---|---|---|---|---|---|
| WLAN Identifiers Per PLMN List | | 1 to 6 | | The number of instances of this IE is the number of instances of the IE "Multiple PLMNs" in the IE "Multiple PLMN List" of the MIB plus one. | REL-12 |

TABLE 3-continued

| Information Element/Group name | Need | Type and Multi reference | Semantics description | Version |
|---|---|---|---|---|
| | | | The first instance of this IE specifies the WLAN Identifiers for UEs which have chosen the PLMN in the IE "PLMN identity" of the MIB, the second instance specifies the WLAN Identifiers for UEs which have chosen the first PLMN in the IE "Multiple PLMNs" in the IE "Multiple PLMN List" of the MIB, the third instance specifies the WLAN Identifiers for UEs which have chosen the second PLMN in the IE "Multiple PLMNs" in the IE "Multiple PLMN List" of the MIB, and so on. | |
| >WLAN Identifiers | OP | WLAN Identifiers 10.3.3.x2 | | REL-12 |

The UE 104 may store all relevant IEs included in the system information blocks. If the UE 104 has active ANDSF policies, the UE 104 may provide the RAN assistance parameters for access network selection and traffic steering between the UTRAN and WLAN to the upper layers.

As discussed above, the RAN assistance parameters may additionally or alternatively be transmitted in a UTRAN mobility information message or a cell update confirm message. The UTRAN mobility information message may be used by the UTRAN to allocate a new RNTI and to convey other UTRAN mobility related information to the UE 104. The radio link control service access point (RLC-SAP) for the UTRAN mobility information message may be acknowledged mode (AM) or unacknowledged mode (UM). The UTRAN mobility information message may be transmitted from the UTRAN (e.g., the Node B 116) to the UE 104 on the dedicated control channel (DCCH) logical channel. The RAN assistance parameters may be optional elements of the UTRAN mobility information message. In embodiments, the UTRAN mobility information message may include the elements outlined in Table 4.

TABLE 4

| Information Element/Group name | Need | Multi | Type and reference | Semantics description | Version |
|---|---|---|---|---|---|
| Message Type | MP | | Message Type | | |
| UE Information Elements | | | | | |
| Integrity check info | CH | | Integrity check info 10.3.3.16 | | |
| RRC transaction identifier | MP | | RRC transaction identifier 10.3.3.36 | | |
| Integrity protection mode info | OP | | Integrity protection mode info 10.3.3.19 | The UTRAN should not include this IE unless it is performing an SRNS relocation | |
| Ciphering mode info | OP | | Ciphering mode info 10.3.3.5 | The UTRAN should not include this IE unless it is performing an SRNS relocation and a change in ciphering algorithm | |
| New U-RNTI | OP | | U-RNTI 10.3.3.47 | | |
| New C-RNTI | OP | | C-RNTI 10.3.3.8 | | |
| New H-RNTI | OP | | H-RNTI 10.3.3.14a | | REL-7 |
| New Primary E-RNTI | OP | | E-RNTI 10.3.3.10a | | REL-8 |
| UE Timers and constants in connected mode | OP | | UE Timers and constants in connected mode 10.3.3.43 | | |

TABLE 4-continued

| Information Element/Group name | Need | Multi | Type and reference | Semantics description | Version |
|---|---|---|---|---|---|
| Dedicated priority information | OP | | Dedicated priority information 10.3.2.7 | | REL-8 |
| WLAN Offload Parameters | OP | | 10.3.3.x1 | | REL-12 |
| WLAN Identifiers | OP | | 10.3.3.x2 | | REL-12 |
| CN Information Elements | | | | | |
| CN Information info | OP | | CN Information info full 10.3.1.3a | | |
| UTRAN Information Elements | | | | | |
| URA identity | OP | | URA identity 10.3.2.6 | | |
| RNC support for change of UE capability | OP | | Boolean | Should be included if the message is used to perform an SRNS relocation | REL-7 |
| RB Information elements | | | | | |
| Downlink counter synchronisation info | OP | | | | |
| >RB with PDCP information list | OP | 1 to <maxRBallRABs> | | | |
| >>RB with PDCP information | MP | | RB with PDCP information 10.3.4.22 | This IE is needed for each RB having PDCP in the case of lossless SRNS relocation | |
| | OP | | | | REL-5 |
| >>PDCP context relocation info | OP | | PDCP context relocation info 10.3.4.1a | This IE is needed for each RB having PDCP and performing PDCP context relocation | REL-5 |

The cell update confirm may confirm a cell update procedure and can be used to reallocate new RNTI information for the UE 104 that is valid in the new cell. The RLC-SAP for the cell update confirm message may be AM or UM. The cell update confirm message may be transmitted from the UTRAN (e.g., the Node B 116) to the UE 104 on the common control channel (CCCH) or the DCCH logical channels. The RAN assistance parameters may be optional elements of the cell update confirm message. In embodiments, the cell update confirm message may include the elements outlined in Table 5.

TABLE 5

| Information Element/Group name | Need | Multi | Type and reference | Semantics description | Version |
|---|---|---|---|---|---|
| Message Type | MP | | Message Type | | |
| UE Information Elements | | | | | |
| U-RNTI | CV-CCCH | | U-RNTI 10.3.3.47 | | |
| RRC transaction identifier | MP | | RRC transaction identifier 10.3.3.36 | | |
| Integrity check info | CH | | Integrity check info 10.3.3.16 | | |
| Integrity protection mode info | OP | | Integrity protection mode info 10.3.3.19 | The UTRAN should not include this IE unless it is performing an SRNS relocation or a cell reselection from GERAN Iu mode | |

TABLE 5-continued

| Information Element/Group name | Need | Multi | Type and reference | Semantics description | Version |
|---|---|---|---|---|---|
| Ciphering mode info | OP | | Ciphering mode info 10.3.3.5 | The UTRAN should not include this IE unless it is performing either an SRNS relocation or a cell reselection from GERAN Iu mode, and a change in ciphering algorithm. | |
| Activation time | MD | | Activation time 10.3.3.1 | Default value is "now" | |
| New U-RNTI | OP | | U-RNTI 10.3.3.47 | | |
| New C-RNTI | OP | | C-RNTI 10.3.3.8 | | |
| New DSCH-RNTI | OP | | DSCH-RNTI 10.3.3.9a | Should not be set in FDD. If received, the UE behaviour is unspecified. | |
| New H-RNTI | OP | | H-RNTI 10.3.3.14a | | REL-5 |
| New Primary E-RNTI | OP | | E-RNTI 10.3.3.10a | | REL-6 |
| New Secondary E-RNTI | OP | | E-RNTI 10.3.3.10a | FDD only | REL-6 |
| RRC State Indicator | MP | | RRC State Indicator 10.3.3.35a | | |
| UTRAN DRX cycle length coefficient | OP | | UTRAN DRX cycle length coefficient 10.3.3.49 | | |
| Wait time | OP | | Wait time 10.3.3.50 | | |
| RLC re-establish indicator (RB2, RB3 and RB4) | MP | | RLC re-establish indicator 10.3.3.35 | Should not be set to TRUE if IE "Downlink counter synchronisation info" is included in message. | |
| RLC re-establish indicator (RB5 and upwards) | MP | | RLC re-establish indicator 10.3.3.35 | Should not be set to TRUE if IE "Downlink counter synchronisation info" is included in message. | |
| WLAN Offload Parameters | OP | | 10.3.3.x1 | | REL-12 |
| WLAN Identifiers | OP | | 10.3.3.x2 | | REL-12 |
| CN Information Elements | | | | | |
| CN Information info | OP | | CN Information info 10.3.1.3 | | |
| UTRAN Information Elements | | | | | |
| URA identity | OP | | URA identity 10.3.2.6 | | |
| RNC support for change of UE capability | OP | | Boolean | Should be included if the message is used to perform an SRNS relocation | REL-7 |
| RB information elements | | | | | |
| RAB information for setup | CV-CS | | RAB information for setup 10.3.4.10 | RAB identity shall be identical to the one currently configured and UE behaviour is unspecified otherwise. | |
| RB information to release list | OP | 1 to <maxRB> | | | |
| >RB information to release | MP | | RB information to release 10.3.4.19 | | |

TABLE 5-continued

| Information Element/Group name | Need | Multi | Type and reference | Semantics description | Version |
|---|---|---|---|---|---|
| RB information to reconfigure list | OP | 1 to <maxRB> | | | |
| >RB information to reconfigure | MP | | RB information to reconfigure 10.3.4.18 | | |
| RB information to be affected list | OP | 1 to <maxRB> | | | |
| >RB information to be affected | MP | | RB information to be affected 10.3.4.17 | | |
| Downlink counter synchronisation info | OP | | | | |
| >RB with PDCP information list | OP | 1 to <maxRBallRABs> | | | |
| >>RB with PDCP information | MP | | RB with PDCP information 10.3.4.22 | This IE is needed for each RB having PDCP in the case of lossless SRNS relocation | |
| | OP | | | | REL-5 |
| >>PDCP context relocation info | OP | | PDCP context relocation info 10.3.4.1a | This IE is needed for each RB having PDCP and performing PDCP context relocation | REL-5 |
| PDCP ROHC target mode | OP | | PDCP ROHC target mode 10.3.4.2a | | REL-5 |
| TrCH Information Elements Uplink transport channels | | | | | |
| UL Transport channel information common for all transport channels | OP | | UL Transport channel information common for all transport channels 10.3.5.24 | | |
| Deleted TrCH information list | OP | 1 to <maxTrCH> | | | |
| >Deleted UL TrCH information | MP | | Deleted UL TrCH information 10.3.5.5 | | |
| Added or Reconfigured TrCH information list | OP | 1 to <maxTrCH> | | | |
| >Added or Reconfigured UL TrCH information | MP | | Added or Reconfigured UL TrCH information 10.3.5.2 | | |
| Downlink transport channels | | | | | |
| DL Transport channel information common for all transport channels | OP | | DL Transport channel information common for all transport channels 10.3.5.6 | | |
| Deleted TrCH information list | OP | 1 to <maxTrCH> | | | |
| >Deleted DL TrCH information | MP | | Deleted DL TrCH information 10.3.5.4 | | |
| Added or Reconfigured TrCH information list | OP | 1 to <maxTrCH> | | | |
| >Added or Reconfigured DL TrCH information | MP | | Added or Reconfigured DL TrCH information 10.3.5.1 | | |

TABLE 5-continued

| Information Element/Group name | Need | Multi | Type and reference | Semantics description | Version |
|---|---|---|---|---|---|
| PhyCH information elements | | | | | |
| Frequency info | OP | | Frequency info 10.3.6.36 | | |
| Multi-frequency Info | OP | | Multi-frequency Info 10.3.6.39a | This IE is used for 1.28 Mcps TDD only | REL-7 |
| DTX-DRX timing information | OP | | DTX-DRX timing information 10.3.6.34b | | REL-7 |
| DTX-DRX Information | OP | | DTX-DRX Information 10.3.6.34a | | REL-7 |
| HS-SCCH less Information | OP | | HS-SCCH less Information 10.3.6.36ab | | REL-7 |
| MIMO parameters | OP | | MIMO parameters 10.3.6.41a | | REL-7 |
| MIMO mode with four transmit antennas parameters | OP | | MIMO mode with four transmit antennas parameters 10.3.6.142 | | REL-11 |
| Control Channel DRX information | OP | | Control Channel DRX information 1.28 Mcps TDD 10.3.6.107 | This IE is used for 1.28 Mcps TDD only | REL-8 |
| SPS Information | OP | | SPS information 1.28 Mcps TDD 10.3.6.110 | This IE is used for 1.28 Mcps TDD only | REL-8 |
| MU-MIMO info | OP | | MU-MIMO info 1.28 Mcps TDD 10.3.6.122 | This IE is used for 1.28 Mcps TDD only | REL-10 |
| Non-rectangular resource allocation indicator | OP | | Enumerated(TRUE) | For 1.28 Mcps TDD only. The absence of this IE indicates that the non-rectangular resource allocation is not used. | REL-12 |
| Non-rectangular resource specific timeslots set | CV-Non-rectangular ResourceAllocation | | Bit string (7) | For 1.28 Mcps TDD only. The value 1 of a bit indicates the corresponding timeslot in which the channelization codes are assigned by physical control channel. The value 0 of a bit indicates the corresponding timeslot in which all channelization codes are assigned when the timeslot is scheduled to the UE. The first/leftmost bit of the bit string is for TS0. | REL-12 |
| Uplink radio resources | | | | | |
| Maximum allowed UL TX power | MD | | Maximum allowed UL TX power 10.3.6.39 | Default value is the existing maximum UL TX power | |

TABLE 5-continued

| Information Element/Group name | Need | Multi | Type and reference | Semantics description | Version |
|---|---|---|---|---|---|
| Uplink DPCH info | OP | | Uplink DPCH info 10.3.6.88 | | |
| E-DCH Info | OP | | E-DCH Info 10.3.6.97 | | REL-6 |
| Uplink secondary cell info FDD | OP | | Uplink secondary cell info FDD 10.3.6.115 | FDD only | REL-9 |
| Multi-carrier E-DCH Info for LCR TDD | OP | | Multi-carrier E-DCH Info for LCR TDD 10.3.6.97a | 1.28 Mcps TDD only | REL-10 |
| Uplink CLTD info FDD | OP | | Uplink CLTD info FDD 10.3.6.125 | FDD only | REL-11 |
| Uplink OLTD info FDD | OP | | Uplink OLTD info FDD 10.3.6.126 | FDD only | REL-11 |
| Downlink radio resources | | | | | |
| Downlink HS-PDSCH Information | OP | | Downlink HS_PDSCH Information 10.3.6.23a | | REL-5 |
| Downlink information common for all radio links | OP | | Downlink information common for all radio links 10.3.6.24 | | |
| Downlink information per radio link list | OP | 1 to <maxRL> | | Send downlink information for each radio link to be set-up | |
| >Downlink information for each radio link | MP | | Downlink information for each radio link 10.3.6.27 | | |
| Downlink secondary cell info FDD | OP | | Downlink secondary cell info FDD 10.3.6.31a | FDD only | REL-8 |
| Additional downlink secondary cell info list FDD | OP | 2 | | | REL-10 |
| >Downlink secondary cell info FDD | OP | | Downlink secondary cell info FDD 10.3.6.31a | FDD only | REL-10 |
| Additional downlink secondary cell info list FDD 2 | OP | 4 | | | REL-11 |
| >Downlink secondary cell info FDD | OP | | Downlink secondary cell info FDD 10.3.6.31a | FDD only | REL-11 |
| Common E-RGCH info FDD | OP | | Common E-RGCH info FDD 10.3.6.138 | FDD only | REL-11 |
| MBMS PL Service Restriction Information | OP | | Enumerated (TRUE) | | REL-6 |
| CELL_DCH measurement occasion info LCR | OP | | CELL_DCH measurement occasion info LCR 10.3.7.126 | | REL-9 |

The cell update confirm message may be subject to the conditions outlined in Table 6.

TABLE 6

| Condition | Explanation |
|---|---|
| CCCH | This IE is mandatory present when CCCH is used and ciphering is not required and not needed otherwise. |
| CS | This IE is optionally present only if CS domain RAB mapping is reconfigured between DCH and E-DCH/HS-DSCH and shall not be present otherwise. |

TABLE 6-continued

| Condition | Explanation |
|---|---|
| Non-rectangular-Resource-Allocation | This IE is optionally present if non-rectangular resource allocation is configured. Otherwise, it is not needed. |

The RAN assistance parameters included in the system information message, the UTRAN mobility information message, and/or the cell update confirm message may have properties as described in Table 7. The "type and reference" column may indicate the size and/or number of possible values that are indicated by the corresponding threshold. Each of the thresholds may be optionally included (or not included) in the corresponding message.

TABLE 7

| Information Element/Group name | Need | Multi | Type and reference | Semantics description | Version |
|---|---|---|---|---|---|
| Thresh$_{ServingOffloadWLAN,LowP}$ | OP | | Integer (0 . . . 62 by step of 2) | RSCP, dB | REL-12 |
| Thresh$_{ServingOffloadWLAN,HighP}$ | OP | | Integer (0 . . . 62 by step of 2) | RSCP, dB | REL-12 |
| Thresh$_{ServingOffloadWLAN,LowQ}$ | OP | | Integer (0 . . . 31) | Ec/N0, dB | REL-12 |
| Thresh$_{ServingOffloadWLAN,HighQ}$ | OP | | Integer (0 . . . 31) | Ec/N0, dB | REL-12 |
| Thresh$_{ChUtilWLAN,Low}$ | OP | | Integer (1 . . . 255) | | REL-12 |
| Thresh$_{ChUtilWLAN,High}$ | OP | | Integer (1 . . . 255) | | REL-12 |
| Thresh$_{BackhRateDLWLAN,Low}$ | OP | | Integer (1 . . . 4194304) | | REL-12 |
| Thresh$_{BackhRateDLWLAN,High}$ | OP | | Integer (1 . . . 4194304) | | REL-12 |
| Thresh$_{BackhRateULWLAN,Low}$ | OP | | Integer (1 . . . 4194304) | | REL-12 |
| Thresh$_{BackhRateULWLAN,High}$ | OP | | Integer (1 . . . 4194304) | | REL-12 |
| Tsteering$_{WLAN}$ | OP | | Integer (0 . . . 31) | | REL-12 |

Figure 2:
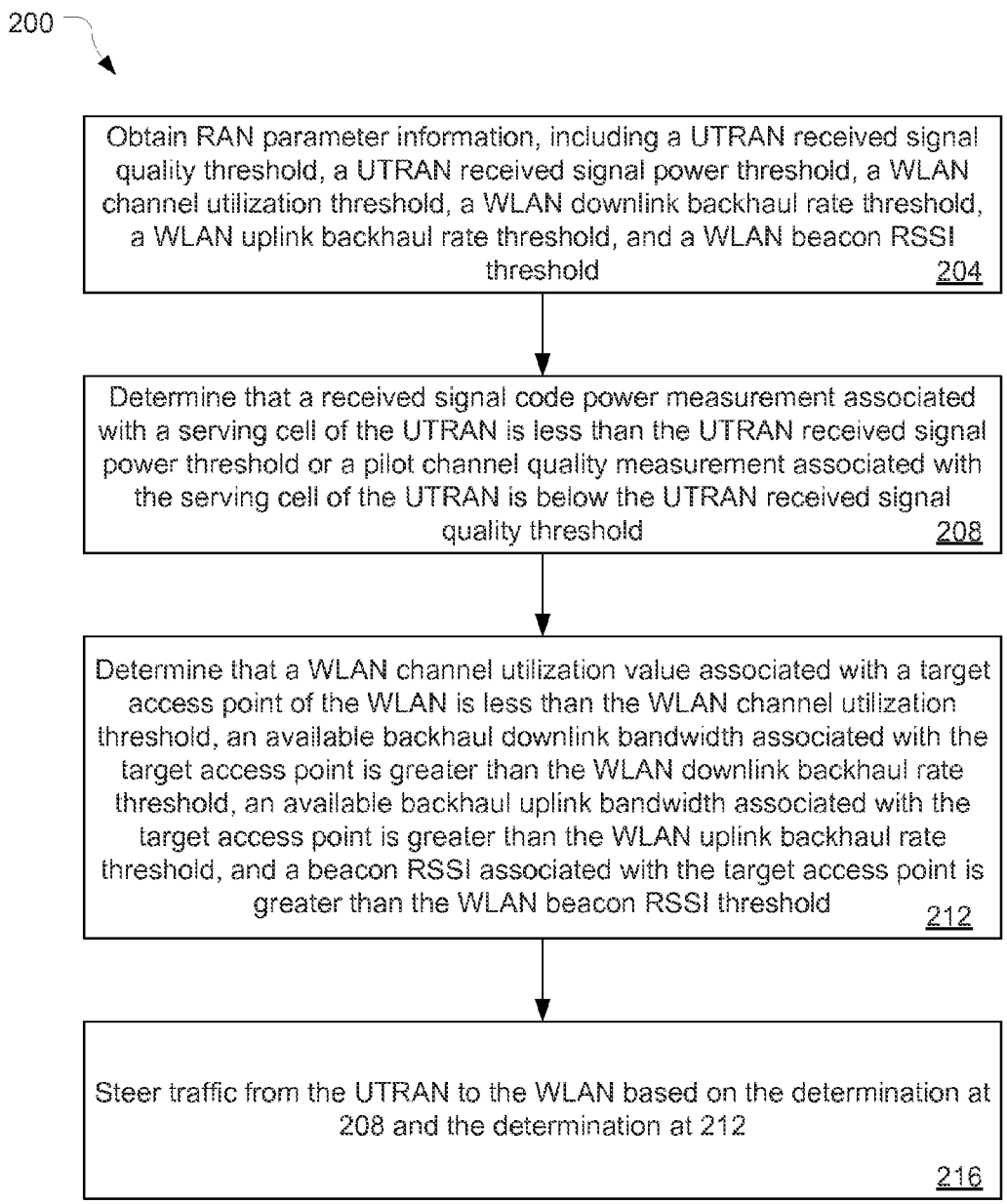
FIG. 2 is flowchart of traffic steering method to be performed by a user equipment to steer traffic from a universal terrestrial radio access network (UTRAN) to a wireless local area network (WLAN) in accordance with some embodiments.

FIG. 2 illustrates a method 200 for traffic steering from a UTRAN to a WLAN that may be performed by a UE (e.g., UE 104) in accordance with various embodiments. In some embodiments, the UE may include or have access to one or more non-transitory computer-readable media having instructions, stored thereon, that when executed cause the UE to perform the method 200.

At 204 of the method 200, the UE may obtain RAN assistance parameters. The RAN assistance parameters may be obtained, for example, from a system broadcast message, a cell update confirm message, or a UTRAN mobility information message. The RAN assistance parameters may include a UTRAN received signal quality threshold, a UTRAN received signal power threshold, a WLAN channel utilization threshold, a WLAN downlink backhaul rate threshold, a WLAN uplink backhaul rate threshold, and a WLAN beacon RSSI threshold.

At 208 of the method 200, the UE may determine that a received signal code power measurement associated with a serving cell of the UTRAN is less than the UTRAN received signal power threshold or a pilot channel quality measurement associated with the serving cell of the UTRAN is below the UTRAN received signal quality threshold.

At 212 of the method 200, the UE may determine that a WLAN channel utilization value associated with a target access point of the WLAN is less than the WLAN channel utilization threshold, an available backhaul downlink bandwidth associated with the target access point is greater than the WLAN downlink backhaul rate threshold, an available backhaul uplink bandwidth associated with the target access point is greater than the WLAN uplink backhaul rate threshold, and a beacon RSSI associated with the target access point is greater than the WLAN beacon RSSI threshold.

At 216 of the method 200, the UE may steer traffic from the UTRAN to the WLAN based on the determination at 208 and the determination at 212.

Figure 3:
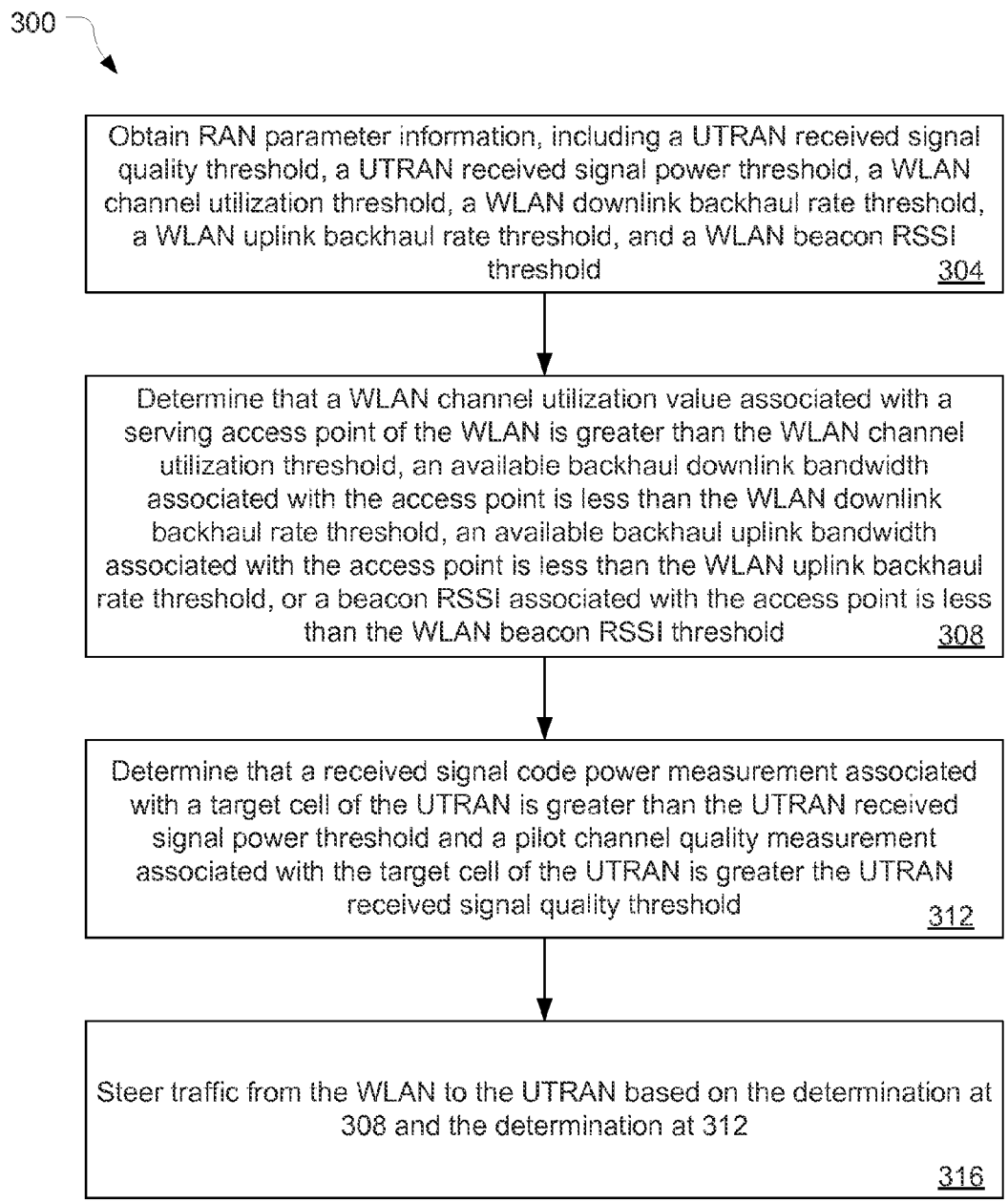
FIG. 3 is flowchart of traffic steering method to be performed by a user equipment to steer traffic from a WLAN to a UTRAN in accordance with some embodiments.

FIG. 3 illustrates a method 300 for traffic steering from a WLAN to a UTRAN that may be performed by a UE (e.g., UE 104) in accordance with various embodiments. In some embodiments, the UE may include or have access to one or more non-transitory computer-readable media having instructions, stored thereon, that when executed cause the UE to perform the method 200.

At 304 of the method 300, the UE may obtain RAN assistance parameters. The RAN assistance parameters may be obtained, for example, from a system broadcast message, a cell update confirm message, or a UTRAN mobility information message. The RAN assistance parameters may include a UTRAN received signal quality threshold, a UTRAN received signal power threshold, a WLAN channel utilization threshold, a WLAN downlink backhaul rate threshold, a WLAN uplink backhaul rate threshold, and a WLAN beacon RSSI threshold.

At 308 of the method 300, the UE may determine that a WLAN channel utilization value associated with a serving access point of the WLAN is greater than the WLAN channel utilization threshold, an available backhaul downlink bandwidth associated with the access point is less than the WLAN downlink backhaul rate threshold, an available backhaul uplink bandwidth associated with the access point is less than the WLAN uplink backhaul rate threshold, or a beacon RSSI associated with the access point is less than the WLAN beacon RSSI threshold.

At 312 of the method 300, the UE may determine that a received signal code power measurement associated with a target cell of the UTRAN is greater than the UTRAN received signal power threshold and a pilot channel quality measurement associated with the target cell of the UTRAN is greater the UTRAN received signal quality threshold.

At 316 of the method 300, the UE may steer traffic from the WLAN to the UTRAN based on the determination at 308 and the determination at 312.

Figure 4:
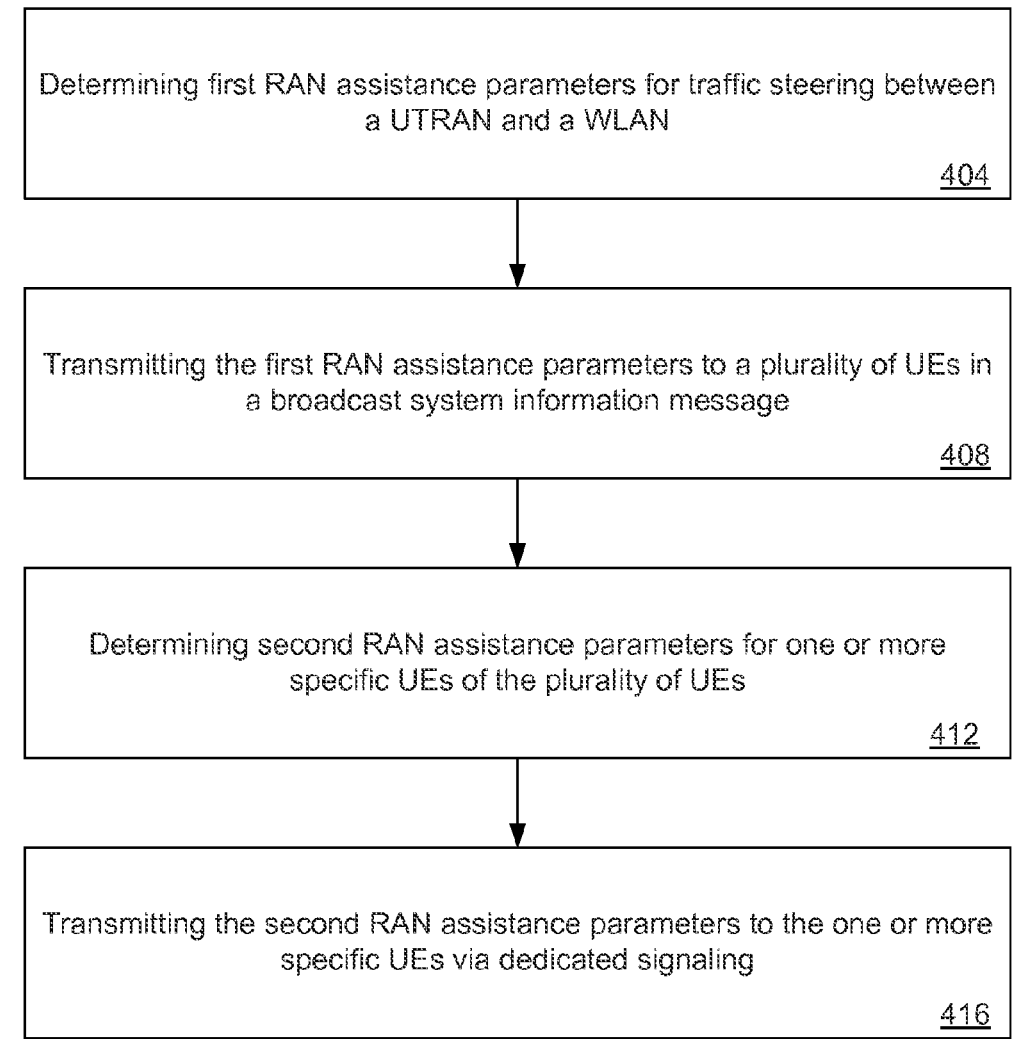
FIG. 4 is a flowchart of a method for managing traffic steering to be performed by a network node in accordance with some embodiments.

FIG. 4 illustrates a method 400 for managing traffic steering that may be performed by a network node in accordance with various embodiments. For example, the method 400 may be performed by a radio network controller (RNC, e.g., network controller 148) of a UTRAN. In some embodiments, the network node may include or have access to one or more non-transitory computer-readable media having instructions, stored thereon, that when executed cause the network node to perform the method 400.

At 404, the method 400 may include determining first RAN assistance parameters for traffic steering between a UTRAN and a WLAN. In some embodiments, the first RAN assistance parameters may include a first set of thresholds for the UE to use to steer traffic from the UTRAN to a WLAN, and a second set of thresholds for the UE to use to steer traffic from the WLAN to the UTRAN, wherein the second set of thresholds is different from the first set of thresholds. In some embodiments, the network node may receive one of more of the RAN assistance parameters from another network node. For example, the RNC may receive the WLAN identifiers from an operations, administration, and maintenance (OAM) system.

At 408, the method 400 may include transmitting the first RAN assistance parameters to a plurality of UEs in a broadcast system information message. For example, the first RAN assistance parameters may be included in one or more system information blocks of the system information message.

At 412, the method 400 may include determining second RAN assistance parameters for one or more specific UEs of the plurality of UEs.

At 416, the method 400 may include transmitting the second RAN assistance parameters to the one or more specific UEs via dedicated signaling. For example, the second RAN assistance parameters may be included in a UTRAN mobility information message or a cell update confirm message.

Figure 5:
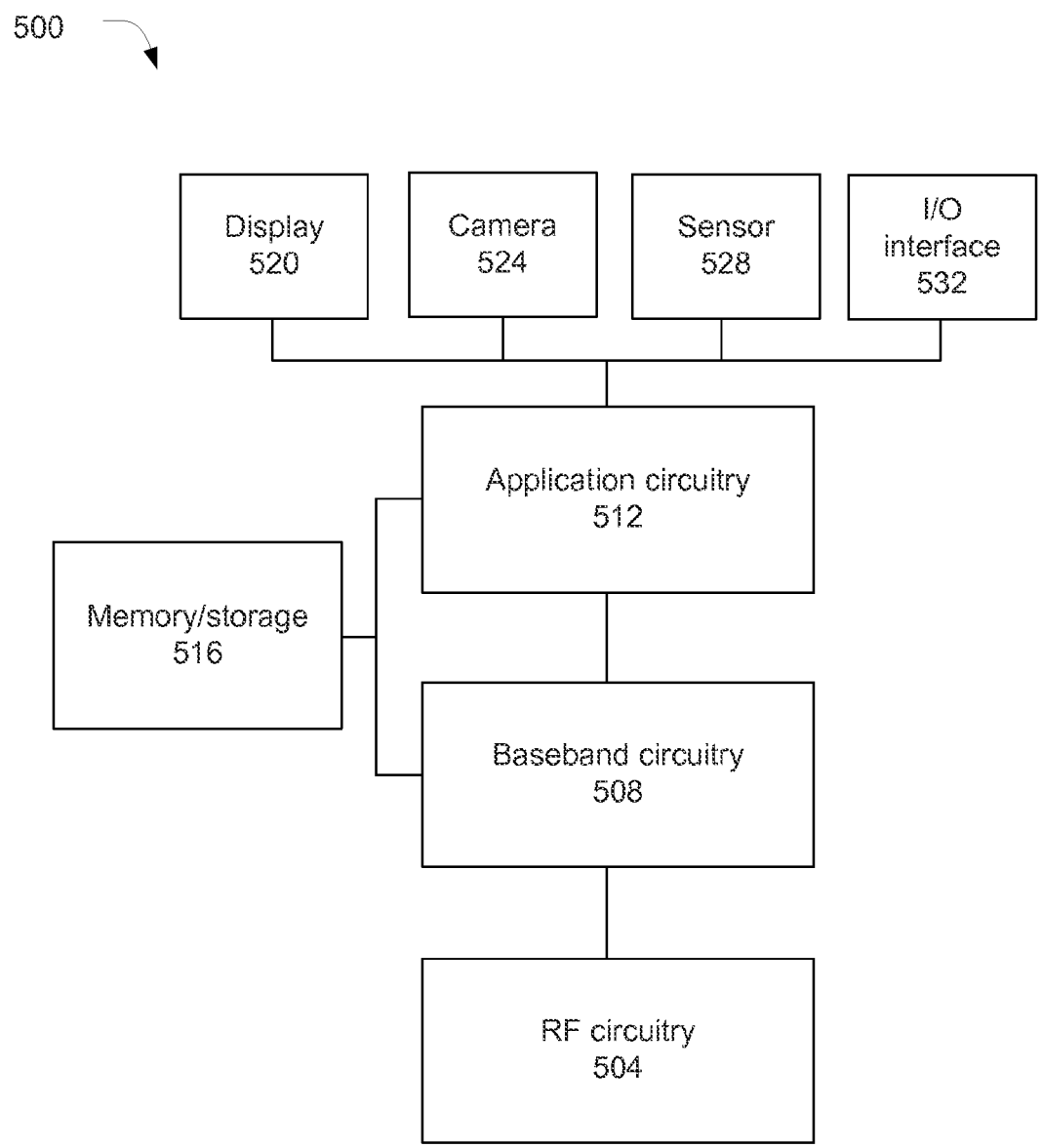
FIG. 5 is a block diagram of an example computing device that may be used to practice various embodiments described herein.

The UE 104, Node B 116, or network controller 148 as described herein may be implemented into a system using any suitable hardware, firmware, or software configured as desired. FIG. 5 illustrates, for one embodiment, an example system 500 comprising radio frequency (RF) circuitry 504, baseband circuitry 508, application circuitry 512, memory/storage 516, display 520, camera 524, sensor 528, input/output (I/O) interface 532, or network interface 536 coupled with each other as shown.

The application circuitry 512 may include circuitry such as, but not limited to, one or more single-core or multi-core processors. The processor(s) may include any combination of general-purpose processors and dedicated processors (e.g., graphics processors, application processors, etc.). The processors may be coupled with memory/storage 516 and configured to execute instructions stored in the memory/storage 516 to enable various applications or operating systems running on the system 500.

The baseband circuitry 508 may include circuitry such as, but not limited to, one or more single-core or multi-core processors such as, for example, a baseband processor. The baseband circuitry 508 may handle various radio control functions that enable communication with one or more radio access networks via the RF circuitry 504. The radio control functions may include, but are not limited to, signal modulation, encoding, decoding, radio frequency shifting, etc. In some embodiments, the baseband circuitry 508 may provide for communication compatible with one or more radio technologies. For example, in some embodiments, the baseband circuitry 508 may support communication with an EUTRAN or other wireless metropolitan area networks (WMAN), a wireless local area network (WLAN), or a wireless personal area network (WPAN). Embodiments in which the baseband circuitry 508 is configured to support radio communications of more than one wireless protocol may be referred to as multi-mode baseband circuitry.

In various embodiments, baseband circuitry 508 may include circuitry to operate with signals that are not strictly considered as being in a baseband frequency. For example, in some embodiments, baseband circuitry 508 may include circuitry to operate with signals having an intermediate frequency, which is between a baseband frequency and a radio frequency.

In some embodiments, the control circuitry 108 or 140, or the management circuitry 156 may be embodied in the application circuitry 512 or the baseband circuitry 508.

RF circuitry 504 may enable communication with wireless networks using modulated electromagnetic radiation through a non-solid medium. In various embodiments, the RF circuitry 504 may include switches, filters, amplifiers, etc., to facilitate the communication with the wireless network.

In various embodiments, RF circuitry 504 may include circuitry to operate with signals that are not strictly considered as being in a radio frequency. For example, in some embodiments, RF circuitry 504 may include circuitry to operate with signals having an intermediate frequency, which is between a baseband frequency and a radio frequency.

In some embodiments, the UMTS radio 112, the WLAN radio 120, or the wireless transceiver 136 may be embodied in the RF circuitry 504.

In some embodiments, some or all of the constituent components of the baseband circuitry 508, the application circuitry 512, or the memory/storage 516 may be implemented together on a system on a chip (SOC).

Memory/storage 516 may be used to load and store data or instructions, for example, for system 500. Memory/storage 516 for one embodiment may include any combination of suitable volatile memory (e.g., dynamic random access memory (DRAM)) or non-volatile memory (e.g., Flash memory).

In various embodiments, the I/O interface 532 may include one or more user interfaces designed to enable user interaction with the system 500 or peripheral component interfaces designed to enable peripheral component interaction with the system 500. User interfaces may include, but are not limited to, a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, sensor 528 may include one or more sensing devices to determine environmental conditions or location information related to the system 500. In some embodiments, the sensors may include, but are not limited to, a gyro sensor, an accelerometer, a proximity sensor, an ambient light sensor, and a positioning unit. The positioning unit may also be part of, or interact with, the baseband circuitry 508 or RF circuitry 504 to communicate with components of a positioning network, e.g., a global positioning system (GPS) satellite.

In various embodiments, the display 520 may include a display (e.g., a liquid crystal display, a touch screen display, etc.).

In various embodiments, the network interface 536 may include circuitry to communicate over one or more wired networks. The transceiver 144 or 152 may be embodied in the network interface 536.

In various embodiments, the system 500 may be a mobile computing device such as, but not limited to, a laptop computing device, a tablet computing device, a netbook, an ultrabook, a smartphone, etc.; or a network node, e.g., an eNB or network controller. In various embodiments, system 500 may have more or fewer components, or different architectures.

Some non-limiting Examples of various embodiments are presented below.

Example 1 is an apparatus to be employed by a user equipment (UE), the apparatus comprising: a Universal Mobile Telecommunications System (UMTS) radio to communicate via a universal terrestrial radio access network (UTRAN); a wireless local area network (WLAN) radio to communicate via a WLAN; and control circuitry coupled with the UMTS radio and the WLAN radio. The control circuitry is to: receive, in a broadcast system information block, a UTRAN mobility information message dedicated to the UE, or a cell update confirm message dedicated to the UE, radio access network (RAN) parameter information including one or more thresholds for traffic steering between the UTRAN and the WLAN; and steer traffic between the UMTS radio and the WLAN radio based on the thresholds.

Example 2 is the apparatus of Example 1, wherein the RAN parameter information is first RAN parameter information received in the UTRAN mobility information message or the cell update confirm message, and wherein the control circuitry is further to: receive second RAN parameter information in the broadcast system information block; and use the first RAN parameter information instead of the second RAN parameter information to steer traffic between the UMTS radio and the WLAN radio.

Example 3 is the apparatus of Example 2, wherein, if the UE is in a CELL_FACH state in the UTRAN, the control circuitry is to discard the first RAN parameters upon cell reselection.

Example 4 is the apparatus of Example 2, wherein, if the UE is in a CELL_DCH state in the UTRAN, the control circuitry is to continue to use the first RAN parameter information upon handover from a serving cell to a target cell of the UTRAN.

Example 5 is the apparatus of Example 2, wherein the control circuitry is further to: start a timer upon entering an idle mode, a CELL_PCH state, or a URA_PCH state in the UTRAN; determine that the timer has expired; and based on the determination, discard the first RAN parameter information and use the second RAN parameter information to steer traffic between the UMTS radio and the WLAN radio.

Example 6 is the apparatus of any one of Examples 1 to 5, wherein the one or more thresholds of the RAN parameter information include a first WLAN beacon received signal strength indication (RSSI) threshold and a second WLAN beacon RSSI threshold that has a lesser value than the first WLAN beacon RSSI threshold, and wherein the control circuitry is to: steer traffic from the UTRAN to the WLAN based on the first WLAN beacon RSSI threshold; and steer traffic from the WLAN to the UTRAN based on the second WLAN beacon RSSI threshold.

Example 7 is the apparatus of Example 1, wherein the RAN parameter information further includes one or more WLAN identifiers to identify WLAN access points that are available to the UE for traffic steering.

Example 8 is the apparatus of any one of Examples 1 to 5, wherein the one or more thresholds of the RAN parameter information include a UTRAN received signal quality threshold, a UTRAN received signal power threshold, a WLAN channel utilization threshold, a WLAN downlink backhaul rate threshold, and a WLAN uplink backhaul rate threshold, and wherein the control circuitry is to determine that: a received signal code power measurement associated with a serving cell of the UTRAN is less than the UTRAN received signal power threshold or a pilot channel quality measurement associated with the serving cell of the UTRAN is below the UTRAN received signal quality threshold; and a WLAN channel utilization value associated with a target access point of the WLAN is less than the WLAN channel utilization threshold, an available backhaul downlink bandwidth associated with the target access point is greater than the WLAN downlink backhaul rate threshold, and an available backhaul uplink bandwidth associated with the target access point is greater than the WLAN uplink backhaul rate threshold. The control circuitry of Example 8 is further to steer traffic from the UTRAN to the WLAN based on the determination.

Example 9 is the apparatus of Example 8, wherein the UTRAN received signal quality threshold, the UTRAN received signal power threshold, the WLAN channel utilization threshold, the WLAN downlink backhaul rate threshold, and the WLAN uplink backhaul rate threshold are different than corresponding thresholds used by the control circuitry to steer traffic from the WLAN to the UTRAN.

Example 10 is the apparatus of Example 8, wherein the one or more thresholds of the RAN parameter information include a UTRAN received signal quality threshold, a UTRAN received signal power threshold, a WLAN channel utilization threshold, a WLAN downlink backhaul rate threshold, and a WLAN uplink backhaul rate threshold, and wherein the control circuitry is to determine that: a WLAN channel utilization value associated with a serving access point of the WLAN is greater than the WLAN channel utilization threshold, an available backhaul downlink bandwidth associated with the serving access point is less than the WLAN downlink backhaul rate threshold, or an available backhaul uplink bandwidth associated with the serving access point is less than the WLAN uplink backhaul rate threshold; and a received signal code power measurement associated with a target cell of the UTRAN is greater than the UTRAN received signal power threshold and a pilot channel quality measurement associated with the target cell of the UTRAN is greater than the UTRAN received signal quality threshold. The control circuitry of Example 10 is further to steer traffic from the WLAN to the UTRAN based on the determination.

Example 11 is an apparatus to be employed by a network controller of a universal terrestrial radio access network (UTRAN), the apparatus comprising: transceiver circuitry to communicate with a user equipment (UE) via the UTRAN; and management circuitry coupled to the transceiver circuitry. The management circuitry of Example 11 is to: transmit, via the transceiver circuitry, a broadcast system information block, a UTRAN mobility information message dedicated to the UE, or a cell update confirm message dedicated to the UE, radio access network (RAN) parameter information that includes a first set of thresholds for the UE to use to steer traffic from the UTRAN to a wireless local area network (WLAN), and a second set of thresholds for the UE to use to steer traffic from the WLAN to the UTRAN, wherein the second set of thresholds is different from the first set of thresholds.

Example 12 is the apparatus of Example 11, wherein the first set of thresholds includes a low UTRAN received signal quality threshold, a low UTRAN received signal power threshold, a low WLAN channel utilization threshold, a high WLAN downlink backhaul rate threshold, and a high WLAN uplink backhaul rate threshold, and wherein the second set of thresholds includes a high UTRAN received signal quality threshold, a high UTRAN received signal power threshold, a high WLAN channel utilization threshold, a low WLAN downlink backhaul rate threshold, and a low WLAN uplink backhaul rate threshold.

Example 13 is the apparatus of Example 12, wherein the first set of thresholds further includes a high WLAN beacon received signal strength indicator (RSSI) threshold, and wherein the second set of thresholds further includes a low WLAN beacon RSSI threshold.

Example 14 is the apparatus of Example 11, wherein the management circuitry is further to transmit, to the UE via the transceiver circuitry, one or more WLAN identifiers to identify one or more WLAN access points that are available to the UE for traffic steering.

Example 15 is the apparatus of any one of Examples 11 to 14, wherein the RAN parameter information is included in the cell update confirm message.

Example 16 is the apparatus of Example 11, wherein the management circuitry is further to determine values for thresholds of the first set of thresholds and the second set of thresholds.

Example 17 is the apparatus of Example 11, wherein the network controller is a Node B of the UTRAN.

Example 18 is one or more non-transitory, computer-readable media having instructions, stored thereon, that when executed cause a user equipment (UE) to: obtain radio access network (RAN) parameter information from a cell update confirm message designated for the UE, the RAN parameter information including a universal terrestrial radio access network (UTRAN) received signal quality threshold, a UTRAN received signal power threshold, a wireless local area network (WLAN) channel utilization threshold, a WLAN downlink backhaul rate threshold, a WLAN uplink backhaul rate threshold, and a WLAN beacon RSSI threshold; determine that: a received signal code power measurement associated with a serving cell of the UTRAN is less than the UTRAN received signal power threshold or a pilot channel quality measurement associated with the serving cell of the UTRAN is below the UTRAN received signal quality threshold; and a WLAN channel utilization value associated with a target access point of the WLAN is less than the WLAN channel utilization threshold, an available backhaul downlink bandwidth associated with the target access point is greater than the WLAN downlink backhaul rate threshold, an available backhaul uplink bandwidth associated with the target access point is greater than the WLAN uplink backhaul rate threshold, and a beacon RSSI associated with the target access point is greater than the WLAN beacon RSSI threshold; and steer traffic from the UTRAN to the WLAN based on the determination.

Example 19 is the one or more media of Example 18, wherein the UTRAN received signal quality threshold, the UTRAN received signal power threshold, the WLAN channel utilization threshold, the WLAN downlink backhaul rate threshold, and the WLAN uplink backhaul rate threshold are different than corresponding thresholds used by the UE to steer traffic from the WLAN to the UTRAN.

Example 20 is the one or more media of Example 18 or Example 19, wherein the RAN parameter information is first RAN parameter information, and wherein the instructions, when executed, further cause the UE to: obtain second RAN parameter information from a broadcast system information block message; and use the first RAN parameter information instead of the second RAN parameter information to steer traffic between the UMTS radio and the WLAN radio.

Example 21 is the one or more media of Example 20, wherein the instructions, when executed, further cause the UE to: determine that the UE is in a CELL_FACH state in the UTRAN; perform cell reselection in the UTRAN to change serving cells; and discard the first RAN parameters upon the cell reselection based on the determination that the UE is in the CELL_FACH state.

Example 22 is the one or more media of Example 20, wherein the instructions, when executed, further cause the UE to: determine that the UE is in a CELL_DCH state in the UTRAN; perform a handover from a serving cell to a target cell of the UTRAN; and continue to use the first RAN parameter information after the handover.

Example 23 is a user equipment (UE) comprising: means to obtain radio access network (RAN) parameter information from a cell update confirm message designated for the UE, the RAN parameter information including a universal terrestrial radio access network (UTRAN) received signal quality threshold, a UTRAN received signal power threshold, a wireless local area network (WLAN) channel utilization threshold, a WLAN downlink backhaul rate threshold, a WLAN uplink backhaul rate threshold, and a WLAN beacon RSSI threshold; means to determine that: a received signal code power measurement associated with a serving cell of the UTRAN is less than the UTRAN received signal power threshold or a pilot channel quality measurement associated with the serving cell of the UTRAN is below the UTRAN received signal quality threshold; and a WLAN channel utilization value associated with a target access point of the WLAN is less than the WLAN channel utilization threshold, an available backhaul downlink bandwidth associated with the target access point is greater than the WLAN downlink backhaul rate threshold, an available backhaul uplink bandwidth associated with the target access point is greater than the WLAN uplink backhaul rate threshold, and a beacon RSSI associated with the target access point is greater than the WLAN beacon RSSI threshold; and means to steer traffic from the UTRAN to the WLAN based on the determination.

Example 24 is the UE of Example 23, wherein the UTRAN received signal quality threshold, the UTRAN received signal power threshold, the WLAN channel utilization threshold, the WLAN downlink backhaul rate threshold, and the WLAN uplink backhaul rate threshold are different than corresponding thresholds used by the UE to steer traffic from the WLAN to the UTRAN.

Example 25 is the UE of Example 23 or Example 24, wherein the RAN parameter information is first RAN parameter information, and wherein the UE further comprises: means to obtain second RAN parameter information from a broadcast system information block message; and means to use the first RAN parameter information instead of the second RAN parameter information to steer traffic between the UMTS radio and the WLAN radio.

Example 26 is the UE of Example 25, further comprising: means to determine that the UE is in a CELL_FACH state in the UTRAN; means to perform cell reselection in the UTRAN to change serving cells; and means to discard the first RAN parameters upon the cell reselection based on the determination that the UE is in the CELL_FACH state.

Example 27 is the UE of Example 25, further comprising: means to determine that the UE is in a CELL_DCH state in the UTRAN; means to perform a handover from a serving cell to a target cell of the UTRAN; and means to continue to use the first RAN parameter information after the handover.

The description herein of illustrated implementations, including what is described in the Abstract, is not intended to be exhaustive or to limit the present disclosure to the precise forms disclosed. While specific implementations and examples are described herein for illustrative purposes, various equivalent modifications are possible within the scope of the disclosure, as those skilled in the relevant art will recognize. These modifications may be made to the disclosure in light of the above detailed description.

What is claimed is:

1. A user equipment (UE) comprising:
a Universal Mobile Telecommunications System (UMTS) radio to communicate via a universal terrestrial radio access network (UTRAN);
a wireless local area network (WLAN) radio to communicate via a WLAN; and control circuitry coupled with the UMTS radio and the WLAN radio, the control circuitry to:
obtain, via broadcast signaling on the UTRAN, first radio access network (RAN) assistance parameters for traffic steering between the UTRAN and the WLAN;
obtain, via dedicated signaling on the UTRAN from a serving cell, second RAN assistance parameters for traffic steering between the UTRAN and the WLAN, wherein the second RAN assistance parameters are to be used by the UE for a plurality of cells of the UTRAN when the UE is in a cell dedicated channel (CELL_DCH) state and are to be used by the UE only for the serving cell from which the second RAN assistance parameters were obtained when the UE is in a cell forward access channel (CELL_FACH) state;
when the UE is in the CELL_DCH state:
apply the second RAN assistance parameters to steer traffic between the UMTS radio and the WLAN radio while the UE is in the CELL_DCH state with the serving cell;
continue to use the second RAN assistance parameters upon handover from the serving cell to a target cell of the plurality of cells of the UTRAN; and
upon a serving radio network subsystem (SRNS) relocation for the UE, discard the second RAN assistance parameters and apply the first RAN assistance parameters to steer traffic between the UMTS radio and the WLAN radio;
when the UE is in the CELL_FACH state with the serving cell of the UTRAN, apply the second RAN assistance parameters to steer traffic between the UMTS radio and the WLAN radio; and
when the UE is in the CELL_FACH state, discard the second RAN assistance parameters upon cell reselection.

2. The UE of claim 1, wherein the control circuitry is further to:
start a timer upon entering a UTRAN idle mode, a UTRAN cell paging channel (CELL_PCH) state, or a UTRAN registration area paging channel (URA_PCH) state;
determine whether the timer has expired;
if it is determined that the timer has not expired, use the second RAN assistance parameters to steer traffic between the UMTS radio and the WLAN radio; and
if it is determined that the timer has expired, discard the second RAN assistance parameters and use the first RAN assistance parameters to steer traffic between the UMTS radio and the WLAN radio.

3. The UE of claim 1, wherein the first RAN assistance parameters and the second RAN assistance parameters include one or more thresholds.

4. The UE of claim 3, wherein the one or more thresholds include a first WLAN beacon received signal strength indication (RSSI) threshold and a second WLAN beacon RSSI threshold that has a lesser value than the first WLAN beacon RSSI threshold, and wherein the control circuitry is to:
steer traffic from the UTRAN to the WLAN based on the first WLAN beacon RSSI threshold; and
steer traffic from the WLAN to the UTRAN based on the second WLAN beacon RSSI threshold.

5. The UE of claim 3, wherein the second RAN assistance parameters further include one or more WLAN identifiers to identify WLAN access points that are available to the UE for traffic steering.

6. The UE of claim 3, wherein the one or more thresholds include a UTRAN received signal quality threshold, a UTRAN received signal power threshold, a WLAN channel utilization threshold, a WLAN downlink backhaul rate threshold, and a WLAN uplink backhaul rate threshold, and wherein the control circuitry is to:
determine that:
a received signal code power measurement associated with a serving cell of the UTRAN is less than the UTRAN received signal power threshold or a pilot channel quality measurement associated with the serving cell of the UTRAN is below the UTRAN received signal quality threshold; and
a WLAN channel utilization value associated with a target access point of the WLAN is less than the WLAN channel utilization threshold, an available backhaul downlink bandwidth associated with the target access point is greater than the WLAN downlink backhaul rate threshold, and an available backhaul uplink bandwidth associated with the target access point is greater than the WLAN uplink backhaul rate threshold; and
steer traffic from the UTRAN to the WLAN based on the determination.

7. The UE of claim 6, wherein the UTRAN received signal quality threshold, the UTRAN received signal power threshold, the WLAN channel utilization threshold, the WLAN downlink backhaul rate threshold, and the WLAN uplink backhaul rate threshold are different than corresponding thresholds used by the control circuitry to steer traffic from the WLAN to the UTRAN.

8. The UE of claim 3, wherein the one or more thresholds include a UTRAN received signal quality threshold, a UTRAN received signal power threshold, a WLAN channel utilization threshold, a WLAN downlink backhaul rate threshold, and a WLAN uplink backhaul rate threshold, and wherein the control circuitry is to:
determine that:
a WLAN channel utilization value associated with a serving access point of the WLAN is greater than the WLAN channel utilization threshold, an available backhaul downlink bandwidth associated with the serving access point is less than the WLAN downlink backhaul rate threshold, or an available backhaul uplink bandwidth associated with the serving access point is less than the WLAN uplink backhaul rate threshold; and a received signal code power measurement associated with a target cell of the UTRAN is greater than the UTRAN received signal power threshold and a pilot channel quality measurement associated with the target cell of the UTRAN is greater than the UTRAN received signal quality threshold; and steer traffic from the WLAN to the UTRAN based on the determination.

9. An apparatus to be employed by a network controller of a universal terrestrial radio access network (UTRAN), the apparatus comprising:

transceiver circuitry to communicate with a user equipment (UE); and management circuitry coupled to the transceiver circuitry, the management circuitry to:

transmit, to the UE via broadcast signaling, first RAN assistance parameters to be used by the UE for traffic steering between the UTRAN and a wireless local area network (WLAN); and transmit, to the UE via dedicated signaling on a serving cell, second RAN assistance parameters for traffic steering between the UTRAN and the WLAN, wherein the second RAN assistance parameters are to be used by the UE, instead of the first RAN assistance parameters, for a plurality of cells of the UTRAN when the UE is in a cell dedicated channel (CELL_DCH) state and are to be used by the UE only for the serving cell on which the second RAN assistance parameters were transmitted when the UE is in a cell forward access channel (CELL_FACH) state;

wherein the second RAN assistance parameters are to be discarded upon a serving radio network subsystem (SRNS) relocation for the UE;

wherein the second RAN assistance parameters are to be used by the UE instead of the first RAN assistance parameters after handover from the serving cell to a target cell of the plurality of cells of the UTRAN if the UE is in the CELL_DCH state; and wherein the first RAN assistance parameters are to be used by the UE instead of the second RAN assistance parameters if the UE performs cell reselection and the UE is in the CELL_FACH state.

10. The apparatus of claim 9, wherein the management circuitry is to transmit the second RAN assistance parameters on a first cell, and wherein the second RAN assistance parameters are further to be used by the UE instead of the first RAN assistance parameters when the UE is in a UTRAN idle mode, a UTRAN cell paging channel (CELL_PCH) state, or a UTRAN registration area paging channel (URA_PCH) state until selection or reselection of a cell other than the first cell or until expiration of a timer since the UE entered the idle mode, the CELL_PCH state, or the URA_PCH state.

11. The apparatus of claim 9, wherein the first RAN assistance parameters include a first set of thresholds for the UE to use to steer traffic from the UTRAN to a wireless local area network (WLAN), and a second set of thresholds for the UE to use to steer traffic from the WLAN to the UTRAN, wherein the second set of thresholds is different from the first set of thresholds.

12. The apparatus of claim 11, wherein the first set of thresholds includes a high WLAN beacon received signal strength indicator (RSSI) threshold, a low UTRAN received signal quality threshold, a low UTRAN received signal power threshold, a low WLAN channel utilization threshold, a high WLAN downlink backhaul rate threshold, or a high WLAN uplink backhaul rate threshold, and wherein the second set of thresholds includes a low WLAN beacon RSSI threshold, a high UTRAN received signal quality threshold, a high UTRAN received signal power threshold, a high WLAN channel utilization threshold, a low WLAN downlink backhaul rate threshold, and a low WLAN uplink backhaul rate threshold.

13. The apparatus of claim 12, wherein the management circuitry is further to transmit, to the UE, one or more WLAN identifiers to identify one or more WLAN access points that are available to the UE for traffic steering.

14. One or more non-transitory, computer-readable media having instructions, stored thereon, that when executed cause a user equipment (UE) to:

obtain, via broadcast signaling on a universal terrestrial radio access network (UTRAN), first radio access network (RAN) assistance parameters for traffic steering between the UTRAN and a wireless local area network (WLAN);

obtain, via dedicated signaling on a serving cell of the UTRAN, second RAN assistance parameters for traffic steering between the UTRAN and the WLAN, wherein the second RAN assistance parameters are to be used by the UE for a plurality of cells of the UTRAN when the UE is in a cell dedicated channel (CELL_DCH) state and are to be used by the UE only for the serving cell from which the second RAN assistance parameters were obtained when the UE is in a cell forward access channel (CELL_FACH) state;

when the UE is in the CELL_DCH state, apply the second RAN assistance parameters to steer traffic between the UTRAN and the WLAN, continue to use the second RAN assistance parameters upon handover from the serving cell to a target cell of the plurality of cells of the UTRAN, and discard the second RAN assistance parameters upon a serving radio network subsystem (SRNS) relocation;

when the UE is in the CELLFACH state with the serving cell of the UTRAN, apply the second RAN assistance parameters to steer traffic between the UMTS radio and the WLAN radio, and discard the second RAN assistance parameters upon cell reselection;

start a timer upon entering a UTRAN idle mode, a UTRAN cell paging channel (CELL_PCH) state, or a UTRAN registration area paging channel (URA_PCH) state;

determine whether the timer has expired;

when it is determined that the timer has not expired, use the second RAN assistance parameters to steer traffic between the UMTS radio and the WLAN radio; and when it is determined that the timer has expired, discard the second RAN assistance parameters and use the first RAN assistance parameters to steer traffic between the UMTS radio and the WLAN radio.

15. The one or more media of claim 14, wherein the second RAN assistance parameters include a first WLAN beacon received signal strength indication (RSSI) threshold and a second WLAN beacon RSSI threshold that has a lesser value than the first WLAN beacon RSSI threshold, and wherein the instructions, when executed, further cause the UE to:

steer traffic from the UTRAN to the WLAN based on the first WLAN beacon RSSI threshold; and steer traffic from the WLAN to the UTRAN based on the second WLAN beacon RSSI threshold.

16. The one or more media of claim 14, wherein the second RAN assistance parameters further include one or more WLAN identifiers to identify WLAN access points that are available to the UE for traffic steering.

* * * * *